(12) United States Patent
Bist et al.

(10) Patent No.: US 11,064,257 B2
(45) Date of Patent: Jul. 13, 2021

(54) SYSTEM AND METHOD FOR SEGMENT RELEVANCE DETECTION FOR DIGITAL CONTENT

(71) Applicant: Monet Networks, Inc., Newport Beach, CA (US)

(72) Inventors: Anurag Bist, Newport Beach, CA (US); Ramon Solves Pujol, Barcelona (ES); Eric Leopold Frankel, Santa Ana, CA (US)

(73) Assignee: Monet Networks, Inc., Newport Breach, CA (US)

( * ) Notice: Subject to any disclaimer, the term of this patent is extended or adjusted under 35 U.S.C. 154(b) by 0 days.

(21) Appl. No.: 16/824,407

(22) Filed: Mar. 19, 2020

(65) Prior Publication Data
US 2020/0288206 A1 Sep. 10, 2020

Related U.S. Application Data

(63) Continuation-in-part of application No. 16/198,503, filed on Nov. 21, 2018, now Pat. No. 10,638,197.
(Continued)

(51) Int. Cl.
| | |
|---|---|
| *H04N 21/475* | (2011.01) |
| *H04N 21/442* | (2011.01) |
| *H04N 21/4223* | (2011.01) |
| *H04N 21/258* | (2011.01) |
| *G06F 16/78* | (2019.01) |
| *G06Q 30/02* | (2012.01) |

(Continued)

(52) U.S. Cl.
CPC ..... *H04N 21/4756* (2013.01); *G06F 16/7867* (2019.01); *G06Q 30/02* (2013.01); *G06Q 50/01* (2013.01); *H04N 21/23418* (2013.01); *H04N 21/25891* (2013.01); *H04N 21/4223* (2013.01); *H04N 21/44218* (2013.01); *H04N 21/6582* (2013.01); *H04N 21/8455* (2013.01); *H04N 21/8456* (2013.01); *H04N 21/8549* (2013.01); *G06K 9/00302* (2013.01)

(58) Field of Classification Search
CPC .......... H04N 21/44218; H04N 21/4756; G06F 16/436; G06K 9/00302; G06K 9/00308; G06K 9/00315
See application file for complete search history.

(56) References Cited

U.S. PATENT DOCUMENTS

| | | | |
|---|---|---|---|
| 6,293,904 B1 | 9/2001 | Blazey | |
| 6,585,521 B1 * | 7/2003 | Obrador | G09B 23/28 369/27.01 |

(Continued)

*Primary Examiner* — Robert J Hance
(74) *Attorney, Agent, or Firm* — Henry J. Cittone; Cittone Demers & Arneri LLP

(57) ABSTRACT

In the present embodiment, a system and a method for tagging a content based on individual cues, emotional score or emotional profile is provided, where the content is a video file, a webpage, a mobile application, a product review or product demo video. The method involves authorizing a user to access the content; capturing a user specific data, an application details and a content specific data in response to the content in real-time; analyzing the captured user specific data, the application detail and the content specific data to generate a user emotional profile; and tagging the user emotional profile with the content in a time granular manner.

24 Claims, 19 Drawing Sheets

Related U.S. Application Data which is a continuation of application No. 15/595,841, filed on May 15, 2017, now abandoned, which is a continuation-in-part of application No. 14/942,182, filed on Nov. 16, 2015, now abandoned, which is a continuation-in-part of application No. 13/291,064, filed on Nov. 7, 2011, now Pat. No. 9,202,251.

(51) Int. Cl.
*H04N 21/234* (2011.01)
*H04N 21/658* (2011.01)
*G06Q 50/00* (2012.01)
*H04N 21/845* (2011.01)
*H04N 21/8549* (2011.01)
*G06K 9/00* (2006.01)

(56) References Cited

U.S. PATENT DOCUMENTS

| | | | |
|---|---|---|---|
| 9,202,251 | B2 | 12/2015 | Bist |
| 10,638,197 | B2 | 4/2020 | Bist |
| 2002/0174425 | A1 | 11/2002 | Markel |
| 2003/0154180 | A1 | 8/2003 | Case et al. |
| 2006/0085419 | A1 | 4/2006 | Rosen |
| 2006/0235884 | A1 | 10/2006 | Pfenninger |
| 2007/0033531 | A1 | 2/2007 | Marsh |
| 2008/0032723 | A1 | 2/2008 | Rosenberg |
| 2008/0091515 | A1 | 4/2008 | Thieberger |
| 2008/0097822 | A1 | 4/2008 | Schigel et al. |
| 2008/0126115 | A1 | 5/2008 | Bennett |
| 2008/0133716 | A1 | 6/2008 | Rao et al. |
| 2008/0222671 | A1 | 9/2008 | Lee |
| 2009/0012925 | A1 | 1/2009 | Brown |
| 2009/0019467 | A1* | 1/2009 | Kim .................. H04N 21/6582 725/14 |
| 2009/0106105 | A1 | 4/2009 | Lewis |
| 2009/0119268 | A1 | 5/2009 | Bandaru |
| 2009/0150919 | A1 | 6/2009 | Lee |
| 2009/0165030 | A1* | 6/2009 | Cronin .................. H04H 60/33 725/14 |
| 2009/0204478 | A1 | 8/2009 | Kaib |
| 2009/0317060 | A1* | 12/2009 | Han .................... H04N 9/8205 386/248 |
| 2010/0017278 | A1 | 1/2010 | Wilen |
| 2010/0049534 | A1 | 2/2010 | Whitnah |
| 2010/0082751 | A1 | 4/2010 | Meijer |
| 2010/0099955 | A1 | 4/2010 | Thomas |
| 2010/0107075 | A1 | 4/2010 | Hawthorne et al. |
| 2010/0121672 | A1 | 5/2010 | Kohler |
| 2010/0138491 | A1 | 6/2010 | Churchill et al. |
| 2010/0144440 | A1 | 6/2010 | Arrasvuori et al. |
| 2010/0153983 | A1 | 6/2010 | Philmon |
| 2010/0250341 | A1 | 9/2010 | Hauser |
| 2010/0269158 | A1 | 10/2010 | Ehler |
| 2010/0312769 | A1 | 12/2010 | Bailey |
| 2011/0143728 | A1 | 6/2011 | Holopainen |
| 2011/0225021 | A1 | 9/2011 | Kantak et al. |
| 2011/0225043 | A1 | 9/2011 | Bhatia |
| 2011/0231240 | A1 | 9/2011 | Schoen |
| 2011/0264531 | A1 | 10/2011 | Bhatia |
| 2011/0301433 | A1 | 12/2011 | Sadowsky |
| 2011/0321175 | A1 | 12/2011 | Slater |
| 2012/0030696 | A1 | 2/2012 | Smith |
| 2012/0072939 | A1 | 3/2012 | Crenshaw |
| 2012/0124122 | A1 | 5/2012 | Kaliouby |
| 2012/0222057 | A1 | 6/2012 | Sadowsky |
| 2012/0222058 | A1 | 8/2012 | Kaliouby |
| 2012/0259240 | A1 | 10/2012 | Llewellynn |
| 2012/0265811 | A1 | 10/2012 | Bist |
| 2013/0014141 | A1 | 1/2013 | Bhatia |
| 2013/0145384 | A1* | 6/2013 | Krum .................... G06Q 30/02 725/10 |
| 2013/0288212 | A1 | 10/2013 | Bist |
| 2014/0137144 | A1* | 5/2014 | Jarvenpaa .......... H04N 21/6582 725/13 |
| 2014/0282651 | A1* | 9/2014 | Baratz ................ H04N 21/4788 725/13 |
| 2015/0350730 | A1* | 12/2015 | el Kaliouby ........... A61B 5/165 725/12 |
| 2016/0015307 | A1 | 1/2016 | Kothuri |
| 2016/0063444 | A1 | 3/2016 | Gupta |
| 2016/0142767 | A1* | 5/2016 | Shigeta ............ H04N 21/44218 725/12 |
| 2016/0241533 | A1 | 8/2016 | Bist |
| 2017/0171614 | A1* | 6/2017 | el Kaliouby ..... H04N 21/42203 |
| 2017/0251262 | A1 | 8/2017 | Bist |
| 2019/0213909 | A1 | 7/2019 | Bist |
| 2019/0364089 | A1 | 11/2019 | Bist |

* cited by examiner

SYSTEM AND METHOD FOR SEGMENT RELEVANCE DETECTION FOR DIGITAL CONTENT

CROSS-REFERENCE TO RELATED APPLICATIONS

This application is a continuation-in-part of U.S. patent application Ser. No. 16/198,503 filed on Nov. 21, 2018, which is a continuation of U.S. patent application Ser. No. 15/595,841 filed on May 15, 2017, now abandoned, which is a continuation-in-part of U.S. patent application Ser. No. 14/942,182 filed on Nov. 16, 2015, now abandoned, which is a continuation-in-part of U.S. application Ser. No. 13/291,064 filed Nov. 7, 2011, issued as U.S. Pat. No. 9,202,251 on Dec. 1, 2015; the disclosures of each of which are hereby incorporated by reference in their entireties.

FIELD OF THE INVENTION

The present invention relates generally to a method for granular tagging of multimedia content in a connected network, and more particularly, to a system that has an ability to add meaningful contextual and personalized information to the content in a granular fashion.

BACKGROUND OF THE INVENTION

With the growth of connected infrastructure, social networking has become more ubiquitous in everyday lives. A large part of our lives is being dictated by online or otherwise accessible content, and how this content is influenced by the tools and the network that connect us. Recent examples include the changes in platforms like Facebook where they are using services like Spotify to deliver content to match people's preferences, partnership of Netflix with Facebook to make their content repository more 'social', Hulu's existing social media tools, and other similar services.

While the above attempts are steps towards making content more relevant for classification, these still don't address a few fundamental issues: (a) how to pin-point specific areas in a content (video or audio) file that could highlight the usefulness of the content in a particular context, (b) some indication of the "True" reactions of individuals, groups of individuals, or a large demography of people to a particular content, or a specific area of the content, (c) a method, or platform to make such granular tagging, rating, and search of content happen in a generic and scalable way.

In light of above, a method and a system for a scalable platform is provided that enables granular tagging of any multimedia or other web content over connected networks. The method of the invention provides an ability to go in much more granular within a content and enable a way to add meaningful contextual and personalized information to it, that could then be used for searching, classifying, or analyzing the particular content in a variety of ways, and in a variety of applications.

OBJECTS OF THE INVENTION

It is a primary object of the invention to provide a system for tagging the content based on the individual and personal cues of the users. One example of these cues is emotional profile or emotional score of the users.

It is a further object of the invention to provide a method for tagging a multimedia content in a granular manner.

It is still a further object of the invention to provide a system that provides a uniform way of continuous and granular tagging of the multimedia content via individual cues, emotional profiles, or emotional scores.

A further and related object of the invention is to provide a method of tagging the content with an instantaneous Emotional Score, an instantaneous Emotional Profile, or an individual cues score based on a specific user's reaction and at a specific time stamp of the content.

BRIEF SUMMARY OF THE INVENTION

In one aspect of the present invention, a system for tagging a content is provided. The system comprising: an authorizing module configured to authorize a request coming from a user through a client device to access one or more content; a capturing means to capture a user specific data in response to said one or more content; an application module for accessing said one or more content, analyzing the captured user specific data and to generate a user emotional profile for a complete duration for which the user has interacted with the content; a processing means to tag the user emotional profile with the content in a time granular manner. The authorizing means further comprising a user opt-in providing one or more options for the user to access the system. The system further comprising a storing means to store said one or more content tagged with the user emotional profile. The storing means store a self reported user feedback, user emotional profile and user snapshot at timed interval along with the said one or more content tagged with the user emotional profile.

The user emotional profile is generated based on the user specific data, content specific data and application details. The user specific data comprises one or more of the data selected from captured snapshots, emotional variation of the user and a self reporting feedback. The application details comprise number of mouse clicks, number of clicked hyperlink or scroll tab. The content specific data comprises information on media event, session data elapsed event, time stamp and metadata.

In an embodiment, the content is a video file, a webpage, a mobile application, a product review or a product demo video. The application module for the video file functions by providing access to the video file; capturing the user specific data in real time; and analyzing the user specific data to generate the user emotional profile. The application module for the webpage perform the function of accessing the webpage, capturing the user specific data in real time and the content specific data; and analyzing the user specific data and the content specific data to generate the user emotional profile. The application module for the mobile application perform the function of accessing the mobile application, capturing the user specific data in real time and the application data; and analyzing the user specific data and the application data to generate the user emotional profile. The application module perform the function of accessing the product review, capturing the user specific data in real time and the content specific data and analyzing the user specific data and the content specific data to generate the user emotional profile.

In another aspect of the present invention, a method for tagging a content is provided. The method comprises: authorizing a request coming from a user through a client device to access one or more content; capturing a user specific data in response to said one or more content; using an application module to access said one or more content, to analyze the captured user specific data and to generate a user emotional profile for a complete duration for which the user has interacted with the content; and tagging the user emotional profile with the content in a time granular manner.

The method further comprising: storing said one or more content tagged with the user emotional profile in a storing means. The storing means store a self reported user feedback, user emotional profile and user snapshot at timed interval along with the said one or more content tagged with the user emotional profile.

The user emotional profile is generated based on the user specific data, content specific data and application details. The user specific data comprises one or more of the data selected from captured snapshots, emotional variation of the user and a self reporting feedback. The application details comprise number of mouse clicks, number of clicked hyperlink or scroll tab. The content specific data comprises information on media event, session data elapsed event, time stamp and metadata.

In an embodiment, the content may be a video file, a webpage, a mobile application, a product review or a product demo video. The application module for the video file function by providing access to the video file; capturing the user specific data in real time; and analyzing the user specific data to generate the user emotional profile. The application module for the webpage perform the function of accessing the webpage, capturing the user specific data in real time and the content specific data; and analyzing the user specific data and the content specific data to generate the user emotional profile. The application module for the mobile application perform the function of accessing the mobile application, capturing the user specific data in real time and the application data; and analyzing the user specific data and the application data to generate the user emotional profile. The application module perform the function of accessing the product review, capturing the user specific data in real time and the content specific data and analyzing the user specific data and the content specific data to generate the user emotional profile.

BRIEF DESCRIPTION OF THE DRAWINGS

The invention will hereinafter be described in conjunction with the figures provided herein to further illustrate various non-limiting embodiments of the invention, wherein like designations denote like elements, and in which.

DETAILED DESCRIPTION OF INVENTION

In the following detailed description of embodiments of the invention, numerous specific details are set forth in order to provide a thorough understanding of the embodiments of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Nowadays with the increase in use of social networking and multimedia content repository, the content is rated based on the individuals liking and disliking of the content. Typically most rating and tagging of content are limited to the option whereby user manually enters the feedback either in form of "like" or "dislike". The present invention provides a system and method that includes individual's cues, emotional scores or profiles to tag a multimedia content in a granular manner. The system combines individual cues score, emotional profile or emotional score of the user in a social networking set up to make a more powerful impact on the user's consumption habit. The present invention further extends the concept of individual cues score, Emotional Score or Emotional Profile tagging of content to a more granular level within a specific content and provides a method and a system to achieve this process in a uniform way, including ways to use such tagging for various methods of analytics and monetization models. The inclusion of individual cues scores; Emotional Scores or Emotional Profiles adds a very unique behavioral aspect to content that may then be used for searching, analytics and various kinds of monetization models for the particular content. The individual cue scores, Emotional Score or Profile is a combination of the emotion, behavior, response, attention span, gestures, hand and head movement, or other reactions or stimuli of the user collected through the sensors available in the client devices and then processed.

Figure 1:
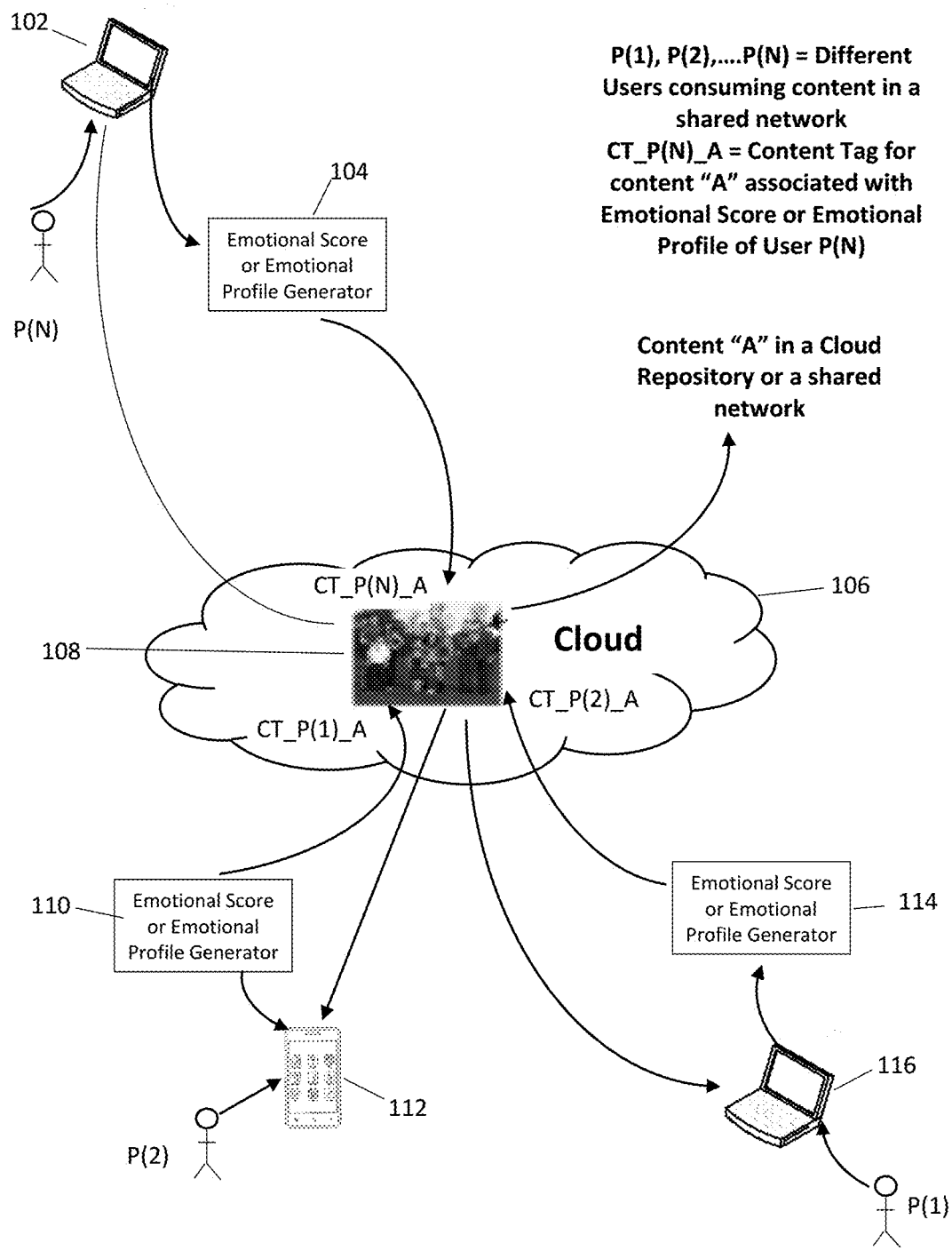
FIG. 1 illustrates a schematic representation of an embodiment of an interacting system for Emotional score or emotional profile based content tagging in connected network in accordance with an embodiment of the present invention.

FIG. 1 illustrates a schematic representation of interacting system for individual cues score, Emotional Score or Emotional Profile based content tagging in connected network in accordance with an embodiment of the present invention. The system comprises of a plurality of (P(1), P(2), . . . , P(N)) connected to each other in a network through their respective client devices: client device 1 116, client device 2 112, and client device N 102. The client devices 102, 112 and 116 are configured with a server in the cloud network 106 that is having a multimedia repository containing content 108 that are accessible by the client devices of the users. The content A 108 is accessible by the different users in the network through their respective client devices 102, 112 and 116. The client devices 102, 112 and 116 have a module that has an inherent ability to continuously capture some critical auditory, visual, or sensory inputs from the individuals. This module is a functionality that may be a combination of the available sensors in the client device (camera/webcam, microphone, other sensors like tactile/haptic etc.) and the available processing modules present in the client devices. The client devices 102, 112 and 116 capture these inputs as they change in response to the individual's reaction to viewing of content A 108 that is part of connected media repository in cloud network 106. The individual cues score, emotional score or emotional profile generator 104 of client device N 102 generates the individual reaction, individual cues score, or emotional score of the user as a result of watching the content. The individual cues score, emotional score or the emotional profile of the user N associated with the content is then used to tag the content A 108 in form of CT_PN_A. Similarly the individual cues score, emotional score or reaction of the user 1 and user 2 is also generated by their respective individual cues score generator or emotional profile generator 114 and 110, and their scores are tagged to the content in form of CT_P1_A and CT_P2_A. As a result of this the content A 108 that has been watched by n number of users, and the individual reaction, individual cues score, or the emotional score (CT_P(1)_A), CT_P(2)_A, . . . , CT_P(3)_A) of each user as a result of watching the content is tagged to the content A 108. The individual cues score or the emotional score tagged to the content is then stored in the cloud network as an update on the individual cues profile or the Emotional Profiles of the users P(1), P(2), . . . P(N). Alternatively, the client devices need not generate and send individual reaction, individual cues score, or the emotional score to the cloud or server, and may instead transmit data (e.g. auditory, visual, or sensory inputs from the individuals) to one or more servers which process said data to create the individual cues score or the emotional score and update the individual cues profile.

In an embodiment of the present invention, the content A 108 tagged by the individual cues scores, Emotional Scores, or Emotional Profiles of a number of users may be used in multiple ways to increase the relevance of the content on an application specific, user specific, or delivery specific contexts.

In an embodiment of the present invention the client device 102 comprises of a single module or a plurality of modules to capture the input data from the individual, to process the input data for feature extraction and a decision phase for generating the profile of the user. Some examples of these input modules may be webcams, voice recorders, tactile sensors, haptic sensors, and any other kinds of sensory modules.

In another embodiment of the present invention, the client devices 102, 112 and 116 include but is not limited to being a mobile phone, a Smartphone, a laptop, a camera with WiFi connectivity, a desktop, tablets (iPAD or iPAD like devices), connected desktops or other sensory devices with connectivity.

In another embodiment of the present invention, the individual cues score, emotional profile or emotional score corresponds to the emotion, behavior, response, attention span, gestures, hand and head movement, or other reactions or stimuli of the user.

Figure 2:
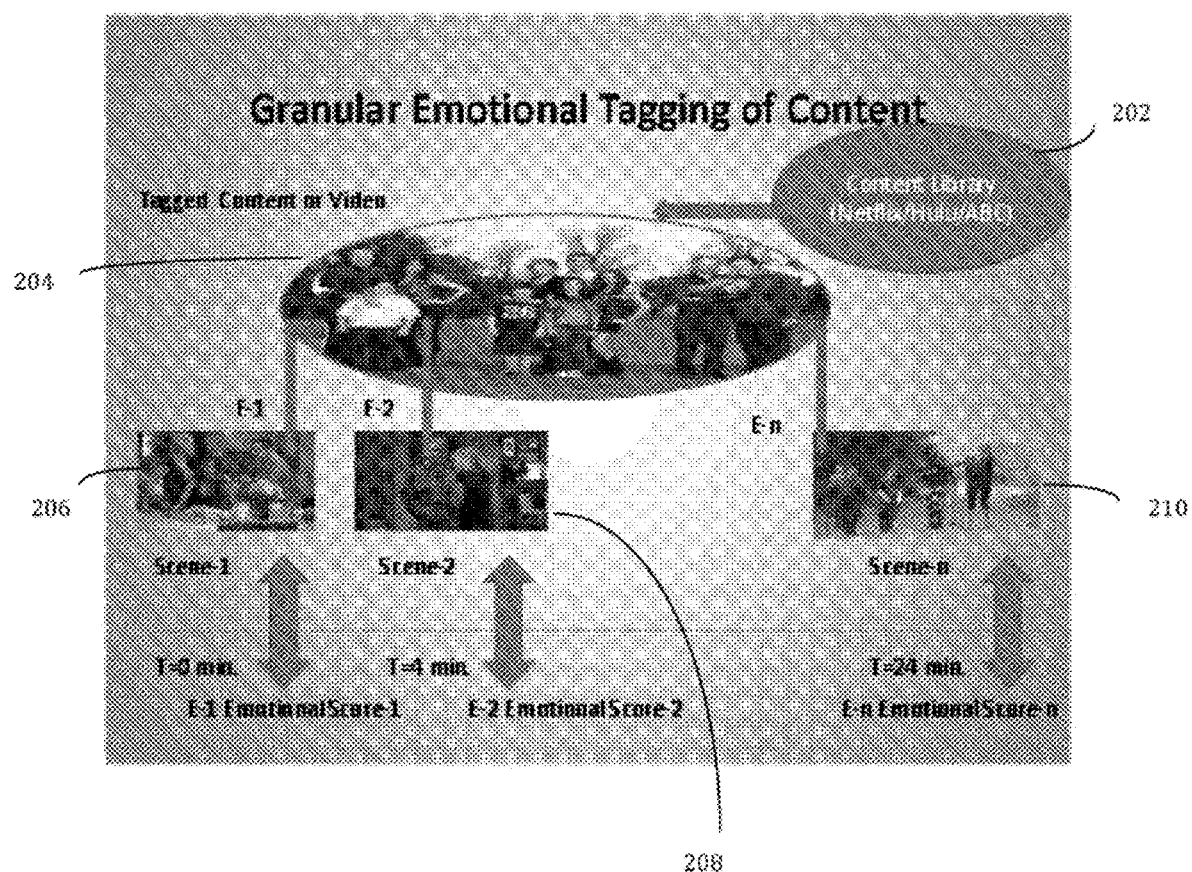
FIG. 2 shows an exemplary illustration of granular tagging of multimedia content in accordance with an embodiment of the present invention.

FIG. 2 shows an exemplary illustration of granular tagging of multimedia content in accordance with an embodiment of the present invention. The example illustrates a method that enables more granular tagging of a multimedia content by the different users. The example shows an episode of a TV show 204 that is 24 minute long that has to be tagged with the emotional score in a granular manner. The episode of TV show 204 is a part of content library 202 or connected repository. The users connected in the network have an access to the content library 202 through their respective client devices, and the content library 202 consists of various channels such as Netflix/Hulu/ABC that provides a link to various multimedia contents available online. When the user watches this multimedia content, the system tags the content by his reaction or emotional score at regular intervals. The example shows a TV show 204 that has to be tagged based on emotional score in a granular manner. While the TV show 204 is being watched by the user, the content is being tagged with the emotional score of the user watching the TV show 204 in a continuous manner. The TV show 204 is divided into number of time segments, for instance scene 1 206 is for time t=0. The emotional score of the user associated with scene 1 is E1. Similarly scene 2 208 is for time interval t=4 min and the emotional score associated with that particular time is E2. Thus, the tagging of the TV show 204 results in a number of tags that are associated with the exact time stamp of a particular segment. At the end of the tagging the TV show 204 now has several reactions or Emotional Score tags that are associated with specific time segments of the show.

In an embodiment of the present invention, the content 204 to be emotionally tagged is divided into a number of time segments, the segments being equally spaced. When the content 204 is tagged by the emotional score of a large number of users, the average emotional score for a particular time segment of the content 204 may be created. This in turn provides a unique way to classify different part of a TV show with very useful information about the user's reactions or Emotional Score tagged with respect to time segment of the TV show. In another embodiment of the present invention the tags may be individual cues of specific users that may include attention span, gestures, head and hand movements and other sensory inputs given by the users while watching a specific content.

Figure 3:
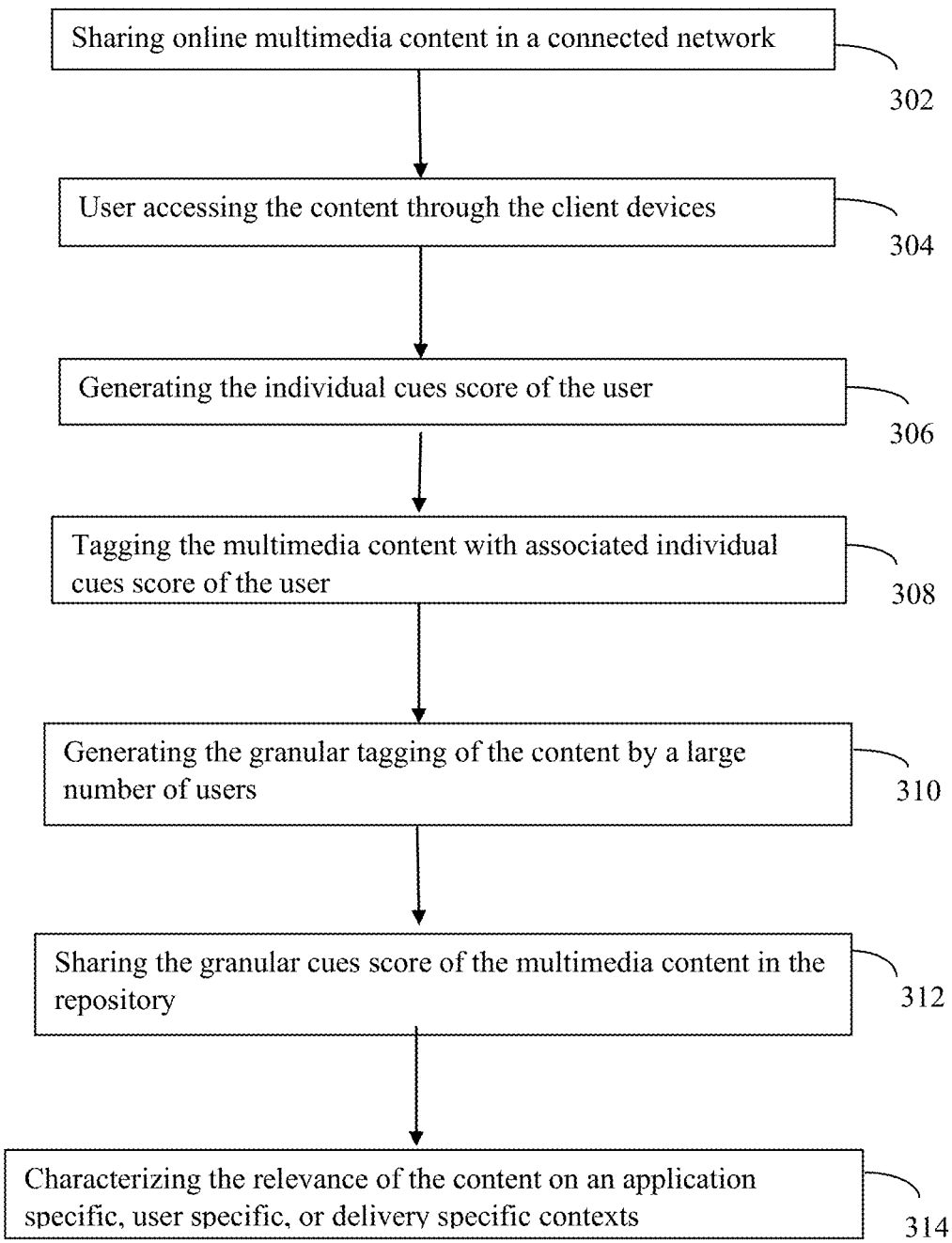
FIG. 3 illustrates a flow diagram depicting the method for tagging the content in a granular manner in accordance with an embodiment of the present invention.

FIG. 3 illustrates a flow diagram depicting the method for tagging the content in a granular manner in accordance with an embodiment of the present invention. In an embodiment, the method include following steps: Step 302: The online media content is stored in multimedia repository which is connected to the server in the cloud network. The multimedia repository being configured to the server has an ability to share the content in the networked environment. Step 304: The plurality of users are connected in the network with each other and to the multimedia repository, and thus have an access to the content in the repository. Step 306: When the user accesses the media content, the user express their feelings in form of individual cues or emotions. These individual cues or emotions are captured by the module present in client devices that generates the individual cues score, emotional score or emotional profile of the user associated with the content being viewed by the user. Step 308: the generated individual cues score, emotional score or emotional profile of the user is tagged to the content. The individual cues score, emotional profile or emotional scores are generated in a continuous manner, and for a particular segment of the content, the score corresponding to that segment is tagged. This results in granular individual cues or emotion based tagging of the video content. Step 310: The granular tagging of the content is done by specifically tagging the individual cues score or emotional score of the user with respect to the content being watched. Thus, the content is tagged with the individual cues score or emotional score of a large number of users. Step 312: After generating the individual cues score or emotional score of the user associated with the media content, the granular individual cues or emotional tagging of the content is shared in the central repository. Thus, the content is having a tag from a large number of users who have watched the content. Step 314: The granular individual cues score or emotional score of the content is then used to characterize the media content.

In an embodiment of the present invention, the tagged information may be used in multiple ways to increase the relevance of the content on an application specific, user specific, or delivery specific contexts.

Figure 4:
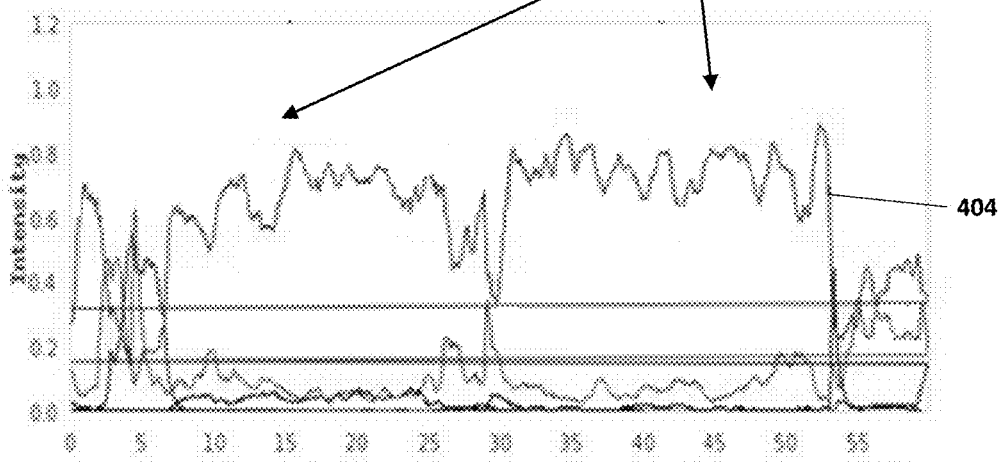
FIG. 4 illustrates a user interface showing the concept of granular emotion based tagging of multimedia content in accordance with an embodiment of the present invention.

FIG. 4 illustrates a user interface showing the concept of granular individual cues or emotion based tagging of multimedia content in accordance with an embodiment of the present invention. The interface 402 shows an output of the module that detects instantaneous reaction, individual cues score, or Emotional Score in a system of the invention. The interface 402 comprises of various regions that shows the outcome of the granular individual cues or emotional tagging of the multimedia content. The region 406 provides the details of video content that has been viewed by the user and is tagged thereafter. The region 406 provides the content details along with metadata that links the content to its source, and the rating given by the user with its intensity and the rating detected by the system through its module. The interface 402 shows the output to the Emotional Score generator module for a specific content ("Epic Chicken Burger Combo" (a YouTube video)). The user's reaction on watching this video is generated by the Emotion Detection module 104. The reaction may be based on a variety of sensors (webcam, voice recording, tactile or haptic sensors, or other sensory modules). The instantaneous Emotional Score of the user is generated as a function of time as shown in region 404. The time axis is synchronized with the time stamps of the content ("Epic Chicken Burger Combo"). The instantaneous score is the normalized Emotion displayed by the user and may have a number of different emotions at any given instance. The graph in the region 404 provides the users emotional score while viewing the content in a continuous granular manner with respect to different time segments. The interface 402 further comprises of a region 408 that provides a D-graph displaying the average value of the emotional score of content 406 and a region 410 that displays a D-graph showing the peak values for the emotional score that has been generated while the user had watched the content 406.

In an embodiment of the present invention, the intensity of the detected emotions vary from the range of 0 to 1 and the different types of emotions used to predict the behavior of the user may be one of 7. The detected emotional state includes Happy, Surprised, Fearful, Normal, Angry, Disgusted, and Sad.

In another embodiment or application, the different emotions may be a smaller subset and may have scores in a different scale. This provides a method of tagging the content with an instantaneous Emotional Score based on a specific user's reaction and at a specific time stamp of the content. Thus, a uniform way of continuous and granular Emotional tagging of any content may be done. In another embodiment of the present invention, the tags may be individual cues scores instead of Emotional Scores. These individual cues scores may include attention span, gestures, head and hand movements and other sensory inputs given by the users while watching a specific content.

In another embodiment of the present invention, the granular tagging of a variety of content may be done by a large number of users. The granular emotional tagging may then be used to provide a characteristic feature to large multimedia repositories that may further be used in multiple ways to characterize the content in a very granular manner.

Once, there is a uniform method of granular tagging of a content repository as described above, there are numerous applications of using the content tagged in the above fashion. Some of these applications are described below, and other related applications are readily apparent to the person skilled in the art based on the ideas described herein.

In an exemplary embodiment of the present invention, the granular emotional tagging of the multimedia content is used to identify the segment which is of concern to the users. The graph of emotional score with respect to time 404 on the reaction of content 406 being watched is used to identify the time segment of interest to the users. For instance, the different time segments of the content 306 are analyzed to find out the scene of interest, based on a query that asks to identify the segments of the video that have displayed the Emotion "Anger">0.4. This brings out the two identified segments as shown in region 412. These kinds of queries may be generalized over a whole set of videos comprising a content repository like Netflix, or YouTube videos.

In another embodiment of the present invention, the system of the present invention is used to identify specific segments of videos that have displayed the highest time averaged specific Emotion (say, "Happy"), or specific segments from a repository that have scored (averaged over all users) a score of "Surprised >0.6".

The method of the present invention may be used to create Movie Trailers for audience based on some initial feedback from a focus group. The system may be used to pick a given set of segments with the same video of content that have scored, say "Happy >0.5", averaged over all users, or all users in a specific age demography. The selected particular segment may be used for creating a movie trailer.

In an embodiment of the present invention, a method for analyzing a context or an event is provided. This analysis results into a system generated feedback report which include amongst others: user's emotion reactions to the context or event, user emotional profile, emotion vector etc. The user's emotions while interacting with the context or event is captured in form of user's sensory or behavioral inputs. While interacting with the context or event, the users leave their emotional traces in form of facial or verbal or other sensory cues. The client device captures various sensory and behavioral cues of the user in response to the context or event or the interaction.

The captured sensory and behavioral cues are mapped into several "Intermediate states". In one of the embodiments of the invention these "Intermediate states" may be related to instantaneous behavioral reaction of the user while interacting with the "Event". The intermediate states mark an emotional footprint of users covering Happy, Sad, Disgusted, Fearful, Angry, Surprised, Neutral and other known human behavioral reactions. The behavioral classification engine assigns a numerical score to each of the intermediate states that designate the intensity of a corresponding emotion. The system also optionally applies a second level of processing that combines the time-aligned sensory data captured, along with the "Intermediate states" detected for any sensors as described in the previous step, in a way to derive a consistent and robust prediction of user's "Final state" in a time continuous manner. This determination of "Final state" from the sensory data captured and the "Intermediate states" is based on a sequence of steps and mapping applied on this initial data (sensory data captured and the "Intermediate states"). This sequence of steps and mapping applied on the initial data (sensory data and the "Intermediate states") may vary depending on the "Event" or the overall context or the use case or the application. The Final state denotes the overall impact of the digital content or event on the user and is expressed in form of final emotional state of the user. This final state may be different based on different kinds of analysis applied to the captured data depending on the "Event", the context, or the application.

The final emotional state of the user is derived by processing intermediate states and their numerical scores. One way of arriving at the Final State may be done in the following way. For each time interval (or the captured video frame) each Intermediate State data goes through a statistical operation based on the instantaneous value of that Intermediate State and its average across the whole video capture of the user in reaction to the Event.

Figure 5:
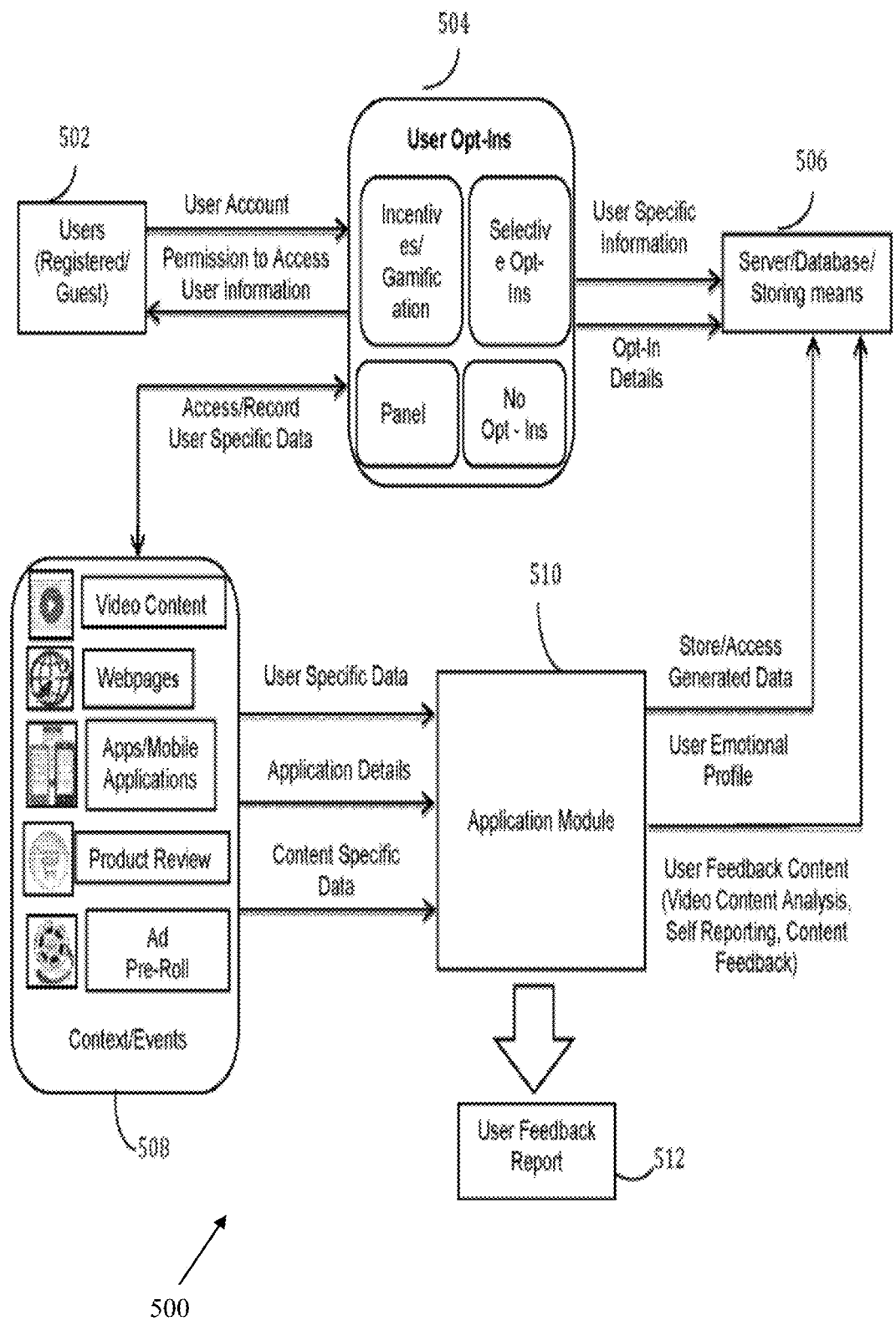
FIG. 5 illustrates a system for tagging context or event, in accordance with an embodiment of the present invention.

FIG. 5 illustrates a system 500 for tagging one or more context or event 508, in accordance with an embodiment of the present invention. An account is created by a user 502 by registering in the system using a client device, wherein an authorizing module 504 is configured to authorize a request coming from the user 502 to access the one or more context or event 508, where the one or more context or event 508 is a video file, a webpage, a mobile application, a product review or a product demo video. Once the user 502 registers him, the user 502 can access the one or more context or event 508. The authorizing means 504 further comprises a user opt-in where user has the option to opt-in for incentive or gamification or other selective options or a panel or can access the one or more context or event 508 directly without selecting any opt-ins. After registration, when the user 502 interacts with the one or more context/event 508, the user specific data, application details and content specific data is captured and stored in a storing means or a database or a server 506. The user specific data comprises captured snapshots, emotional variation of the user 502 and a self-reporting feedback with respect to the one or more context or event. The application details includes number of mouse clicks, number of clicked hyperlink or scroll tab and the content specific data comprises information on media event, session data elapsed event, time stamp and metadata.

The system 500 also comprises an application module and a processing means. The application module 510 accesses the one or more context or event 508 and analyzes the captured user specific data, application details and content specific data to generate a user feedback result 512 for a complete duration for which the user has interacted with the context or event 508. The processing means tags the user feedback result 512 with the context or event 508 in a time granular manner.

In an exemplary embodiment, said one or more context or event 508 may be a video file. The application module 510 accesses the video file, and captures the user specific data in real time while the user is viewing the video file. The captured user specific data is then analyzed to generate the user emotional profile or a feedback report. The user is also provided with option to give their feedback. The user profile and the context information is then sent to the storing means or the database or the server. The user emotional profile and the feedback report generated by the system is also stored in the storing means. The storing means or the database or the server also include information on the session information and the user specific information. The session information includes media events, elapsed events, emotion vectors, time stamps. The user specific information includes user data, event data, timestamp data, and metadata and user emotional profile data.

In another exemplary embodiment, the one or more context is a webpage. The application module allows the user to access the webpage. Thereafter, it monitors the user reactions and captures the session information. The captured user reactions and the session information is then analyzed along with the session details to generate a feedback report. The application module then transfers the session information along with the user emotional profile and self reporting feedback together with the system generated feedback report to the storing means or server or the database. The session information includes information pertaining to an event, mouse clicks, and hyperlinks on the webpage and time stamp data. The user specific information for webpage includes user emotional profile, time stamp and metadata.

In another exemplary embodiment of the present invention, the one or more context or the event is a mobile application. The application module configured for the mobile application data performs the function of accessing the mobile application and captures and records the user specific data and application specific data in real time to analyze the user specific data and the application data to generate user feedback result. The application module transfers the context/application profile data in the form of mobile application generated data, user emotional profile, self reporting feedback report and the system generated feedback result to the server or the storing means or the database. The context/application profile data includes the user information, event, application information and timestamp data. The user specific information includes user emotional profile, emotional vector, timestamp and metadata.

In another exemplary embodiment of the present invention, the one or more content is a product review or a product demo video. The application module first accesses the product review or the product demo content. The application module monitors or captures the review session and analyzes the review session data to generate the system feedback report. The application module then transfers the product information, user specific information, self reported feedback report and system generated feedback result to the storing means or the database or the server. The product information includes product review profile such as user information, event data, review data and timestamp data. The user specific information includes user emotional profile, emotion, time stamp and metadata.

Figure 6:
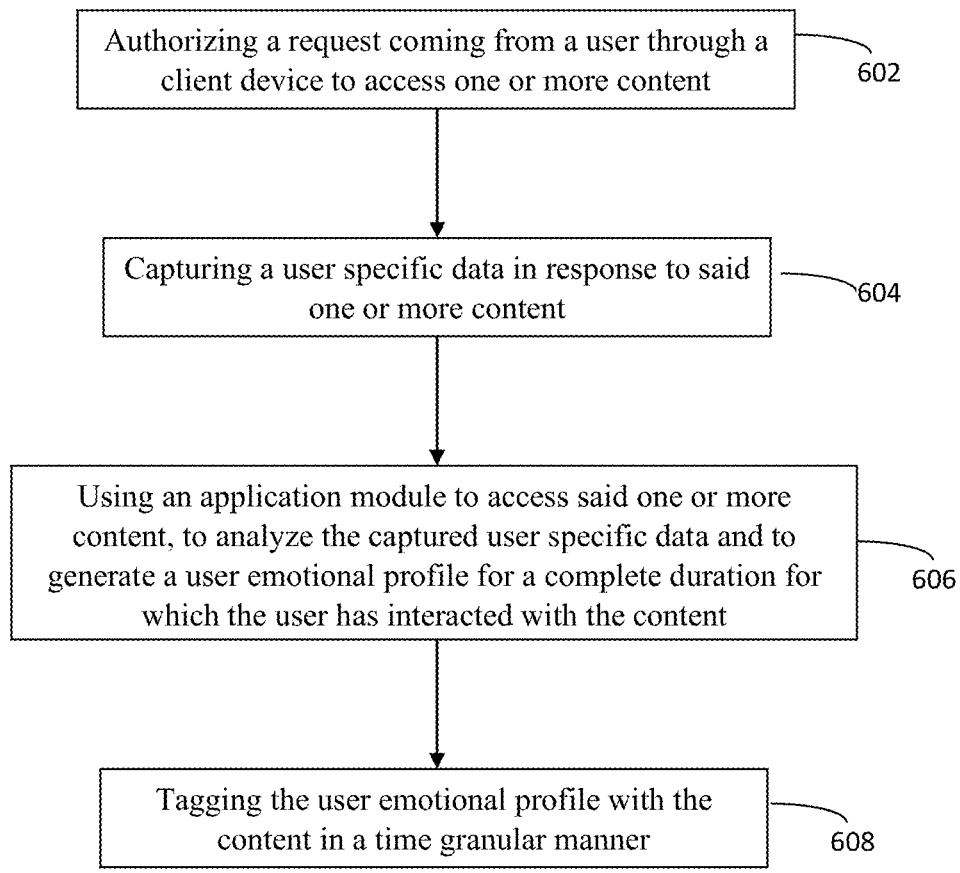
FIG. 6 shows a block diagram illustrating the method for tagging context or event, in accordance with an embodiment of the present invention.

FIG. 6 shows a block diagram illustrating the method for tagging context or event, in accordance with an embodiment of the present invention. The method of tagging includes the steps of authorization, data capturing, analysis of the captured data and profile generation. A user registers him/her to interact with one or more online content, wherein the one or more online content is a video file, a webpage, mobile application and product review or product demo video. At step 602, a request coming from the user through a client device to access one or more online content is being authorized at the backend. After authorization, user can access the one or more online content. When the user interacts with the one or more online content, his/her user specific data, application details and content specific data is captured accordingly at step 604. In the present invention, the user specific data is the data selected from captured snapshots, emotional variation of the user and a self-reporting feedback, the application details are number of mouse clicks, number of clicked hyperlink or scroll tab and the content specific data is information on media event, session data elapsed event, time stamp and metadata. In the step 606, an application module accesses the one or more online content, to further analyze the captured user specific data, the application details and the content specific data and thereby generates a user emotional profile for a complete duration for which the user has interacted with the content. After generation of the user emotional profile, tagging of the user emotional profile is done with the one or more online content in a time granular manner at the step 608.

Figure 7A:
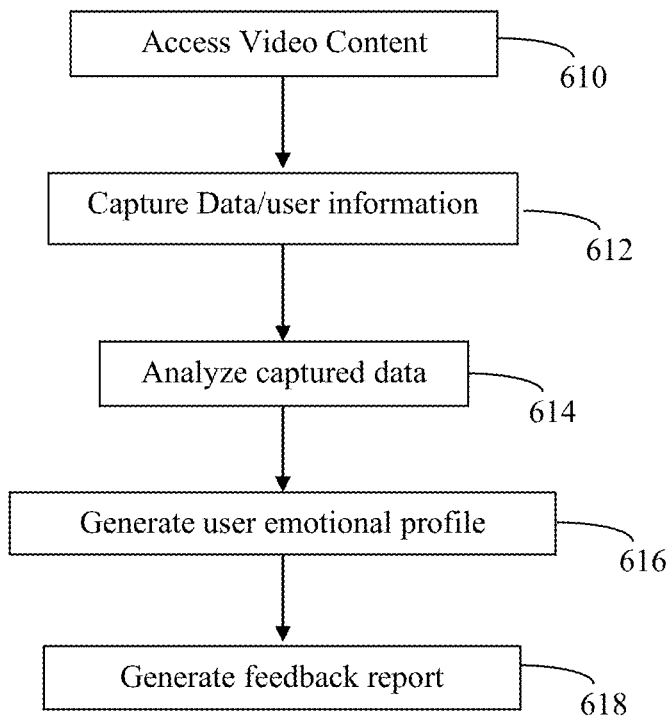
FIG. 7A shows a block diagram illustrating the method used by an application module for tagging a video file, in accordance with an exemplary embodiment of the present invention.

FIG. 7A shows a block diagram illustrating the method used by an application module for tagging a video file, in accordance with an exemplary embodiment of the present invention. The application module generates a feedback report for the video file. The feedback report is generated by a method comprising: At step 610, the application module accesses the video content. Proceeding at step 612, capturing the user specific data in real time followed by step 614: analyzing the user specific data. At step 616, user emotional profile is generated and at step 618: the feedback report is generated for the video file.

Figure 7B:
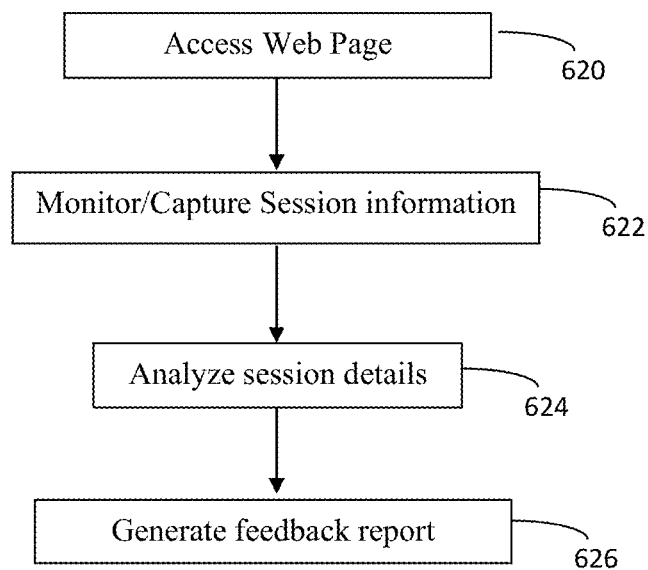
FIG. 7B shows a block diagram illustrating the method used by an application module for tagging a web page, in accordance with an exemplary embodiment of the present invention.

FIG. 7B shows a block diagram illustrating the method used by an application module for tagging a web page, in accordance with an exemplary embodiment of the present invention. The application module generates a feedback report for the webpage by following a method, the method comprising: At step 620 accessing the webpage, followed by step 622 of capturing the user specific data and content specific data in real time and then at step 624 analyzing the user specific data and the content specific data. At step 626, the application module generated the feedback report for the webpage.

Figure 7C:
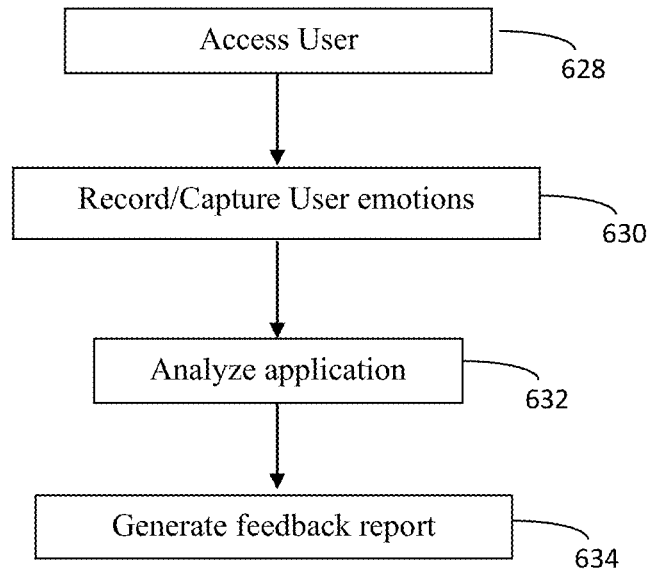
FIG. 7C shows a block diagram illustrating the method used by an application module for tagging a mobile application, in accordance with an exemplary embodiment of the present invention.

FIG. 7C shows a block diagram illustrating the method used by an application module for tagging a mobile application, in accordance with an exemplary embodiment of the present invention. A feedback report is generated by the application module by following: At step 628, the user first accesses the mobile application using the application module. During the interaction his/her user specific data and application details are captured in real time at step 630. After this, the user specific data and the application details are analyzed at step 632 to generate the user emotional profile at step 634.

Figure 7D:
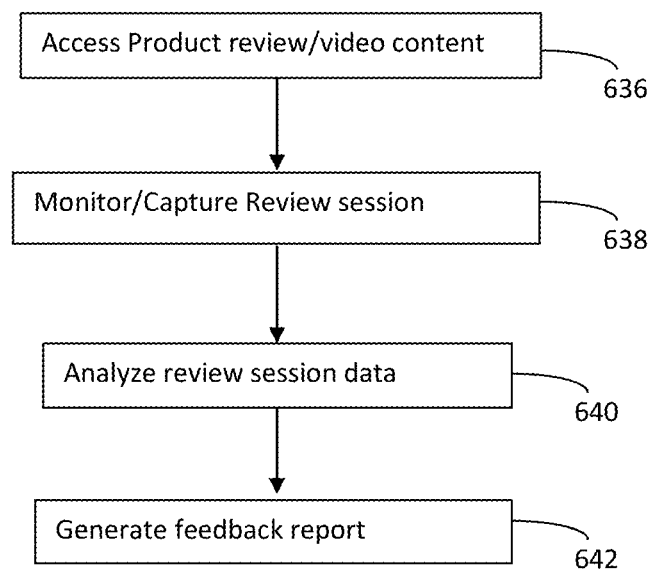
FIG. 7D shows a block diagram illustrating the method used by an application module for tagging a product review or a product demo video, in accordance with an exemplary embodiment of the present invention.

FIG. 7D shows a block diagram illustrating the method used by an application module for tagging a product review or a product demo video, in accordance with an exemplary embodiment of the present invention. The application module generates a feedback report for the product review or demo video by following the method comprising: At step 636 the application module accesses the product review, and captures the user specific data and the content specific data in real time at step 638. The application module, analyzes the user specific data and the content specific data in step 640 and the application module generates the feedback report at step 642.

In one of the embodiments of the present invention, the present invention provides a unique method and a system for media content analysis based on pushing target content to a defined set of participants capturing participant's real time reactions in form of non-verbal cues and participant's facial expressions as the participant watch the content. The method and the system is related to identifying the most engaging short segments within a large digital content based on real time emotion and reaction data gathered at scale. The components of system are described in FIG. 1, in which the system comprises a server module from which a given digital content that is being tested is streamed to a large set of participants or users. A content owner can upload a media content in the server for which the content analysis is required.

The system is accessible by the content owner and the participants who wish to take part in the content analysis using a web-page or a web-based application. The web-page or the web-based application is provided with features such as secure log-in, personalized profile etc. along with other features.

The participants can use a web-based browser or a smart-phone based application to stream the video contents from server. The system has ability to micro-target demographics based on the digital content that is being tested. The ability to micro-target demographics is an important one since this gives the content owner a way to gather relevance of the content based on different kind of audience. The participants who are sent this content "opt-in" to watch this content in a device of their choice. This device could be any device with connectivity that is able to receive the content link via an e-mail or a link sent through internet or over a mobile device. This device could be any of the following: a laptop or desktop with camera or audio capture capability, a smart-phone with display and video and audio capture capability or any such internet enabled device. Once the user "opt" in, the user is told that his or her camera would be turned on and her emotions and/or reactions would be captured as they are watching the content. The same content is pushed to a large number of users and their emotions and/or reactions are captured at scale.

The present invention comprises a unique media content evaluation method based on combining multi-modal inputs from the audiences that may include reactions and emotions that are recorded in real-time on a frame-by-frame basis as the participants are watching digital content. The system pushes the same content to a different set of users. For one set of users, the users will only be asked to watch the content as they system records and analyzes their facial expressions to gather their frame by frame emotional reaction. For another set of users the users are explicitly asked to react via customized Emojis on a frame by frame basis to indicate what they feel like reacting in a granular manner as the content is being watched. In one embodiment of this invention these Emojis could be (Like, Dislike, Love, Want, and Memorable). The user could click and one of them at any specific frame while watching the content. Sometimes, the same set of users may be asked to click the Emojis and their emotional behavior would also be tracked on a frame by frame basis.

System Architecture

FIG. 1 illustrates a schematic architecture of the system used for identifying the segments of interest within a large digital content based on real time emotion and reaction data gathered at scale. The system comprises a server module or cloud 106 from which a given digital content that is being tested is streamed to a large set of people. There are two type of users (102, 104, 106) in the system: first type is of content owner who posts their media or digital content in the server 106 for which the analysis is requires and other type of users are participants in the survey whose facial expression or reactions are captured to analyze the video content. The content owner and the participants can access the server module or cloud 106 using a web-page or a web based application. The content owner and the participants can register themselves to utilize the service of the web-page or web based application. On registration a profile page may be generated for the content owner and the participants.

The content owner can upload their media content or digital content in the server using the web-page or web-based application. The media content or the digital content then get stored in the repository or database in the server.

The media content in the server can be viewed by the participants using a web-enabled device which can be used to stream the media content from server using Internet. The web-enabled device 102 includes but is not limited to being a mobile phone, a smartphone, a laptop, a camera with Wi-Fi connectivity, a desktop, tablets (iPad or iPad like devices), connected desktops or other sensory devices with network connectivity and processor capability. The web-enabled device may comprise a camera which is used to capture the facial expression of the participants while the participant is watching the media content. The facial expressions are captured in form of video data in time granular manner. The server in the cloud 118 has the ability to interact with the web-enable devices 102, 114 and 116 in a real time manner, such that the facial expressions of the participants are captured in real-time. The web-enabled device may also comprise other input means which can be used to capture other non-verbal cues of the user, such as audio-text conversion, gesture, eye movement tracking, head movement tracking and possible feedbacks from other sensory inputs that can capture haptic, tactic feedback that could relate to participant engagement or disengagement with the media content. The captured facial expression and reactions in form of non-verbal cues are then processed at server end for analyzing the content.

Figures 8, 9:
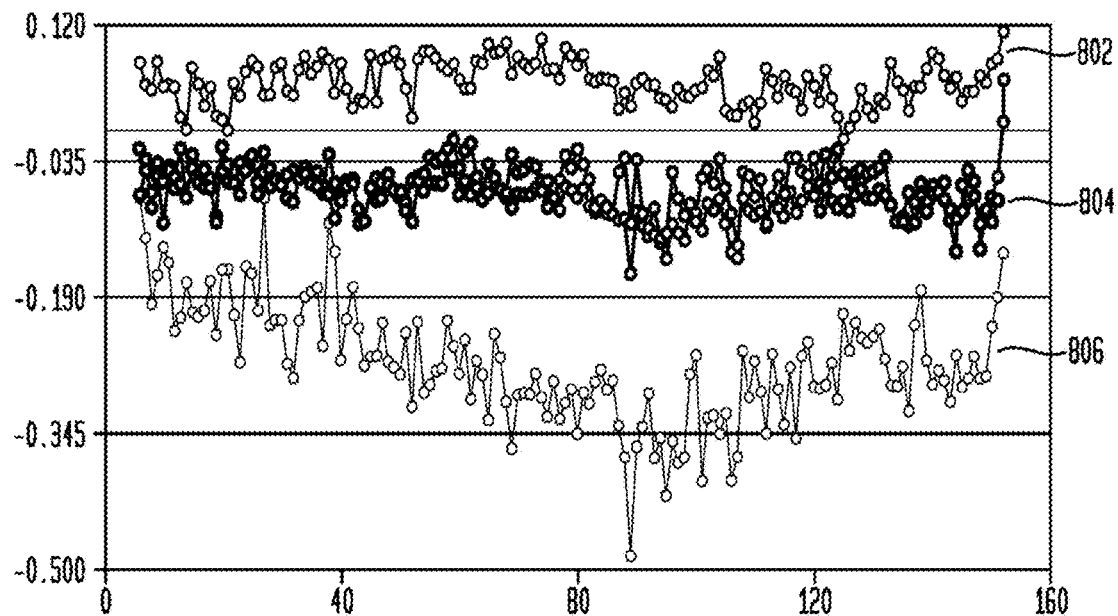
FIG. 8 shows a dashboard on the web-page of a service provider in accordance with an exemplary embodiment of the present invention.
FIG. 9 shows different levels or cohorts of participants in accordance with an exemplary embodiment of the present invention.

FIG. 8 shows a dashboard on the web-page of service provider for creating campaign by a content owner to create a campaign for capturing facial expressions of a group of participants in accordance with an embodiment of the present invention. The campaign owner can specify details such as campaign name, description of the campaign, campaign type (video, audio etc.), campaign URL, start date, end date etc. The content owner can determine which emotional evaluation he wants for analyzing the media content. The content owner can select the box 702 for analyzing media content in term of facial expression, and can select box 704 for capturing user reaction in term of non-verbal cues. In the given example of FIG. 7, the various facial expressions that are being used for analyzing the media content are Joy, Sad, Surprised, Neutral, Disgusted, Fear and Angry. And the various reactions studied for the participants are Dislike, Love, Want, Love and Memorable.

In an embodiment of the present invention, while creating a campaign, the content owner can specify one or more questions that need to be answered by the participants for analyzing the engagement of the participant with the media content.

In another embodiment, the content owner can specify the attributes that should be met by the participants for participating in the content analysis. The attributes that can be specified by the content owner may include age, religion, geographical distribution, gender, ethnicity etc.

In an embodiment, the present invention provides a method for evaluating media content based on combining multi-modal inputs from the participants that include reactions and emotions (captured in form of facial expression)

that are recorded in real-time on a frame-by-frame basis. The real time reactions and emotions may be recorded in two different steps or campaigns (with two different sets of people), and which include different participants for each.

In an exemplary embodiment of the present invention, the facial expression and reactions are captured for two different set of participants: for the first set of participants, the participants emotions are captured and analyzed in term of Facial expression detection and physiological response analysis; and for the second set of participants, their captured reactions are analyzed in term of real-time reaction detection and reaction analysis.

Facial Expressions Detection and Physiological Responses Analysis

When a campaign is launched by the content owner, the participants are informed about the campaign through various notifications, such as email, SMS or other means. Only those participants are informed which matches with the attributes specified by the content owner for a particular media content. When the participants watch the media content on the web-page of the service provider, which is being streamed from the server, they are video-recorded and audio-recorded and their on-going emotions while watching the content are being recorded. When the media content is being displayed at the web-enabled device of the participants, the facial expressions of the participants are continuously recorded by the web-enabled device which is being continuously transmitted to the server through internet. The server comprises a processor, an application program and a facial pattern determination engine that segments on a per frame basis, the reaction of individual participants into multitude of probability of macro facial expressions as well as the intensity of emotions displayed at each frame.

The server processed the video-recording of the individual participants and extracts a set of physiological response measurements such as Arousal, which is a measure of intensity of engagement. The facial pattern determination engine studies the facial pattern of the participant in frame by frame manner to classify the facial expression of users into one or more emotional states. The one or more emotional state may comprise Angry, Disgust, Fear, Joy, Neutral, Sad and Surprise among others. The emotional states are categorized into positive and negative emotional states. The facial pattern determination engine also determines the value of different emotional states in a frame by frame manner, wherein the value of the emotional state signifies its corresponding intensity.

In an illustrative example, the positive emotional states include Joy and Surprise, whereas the negative emotional states include Angry, disgust, neutral, sad and Fear. At the server, valence is determined by subtracting the maximum of negative emotions value from the maximum of positive emotions value. Valence is an indirect indicator of the effectiveness of the media content. If the valence is positive, then the corresponding frame is positive and when the valence is negative, it signifies the frame is negative.

Figure 10:
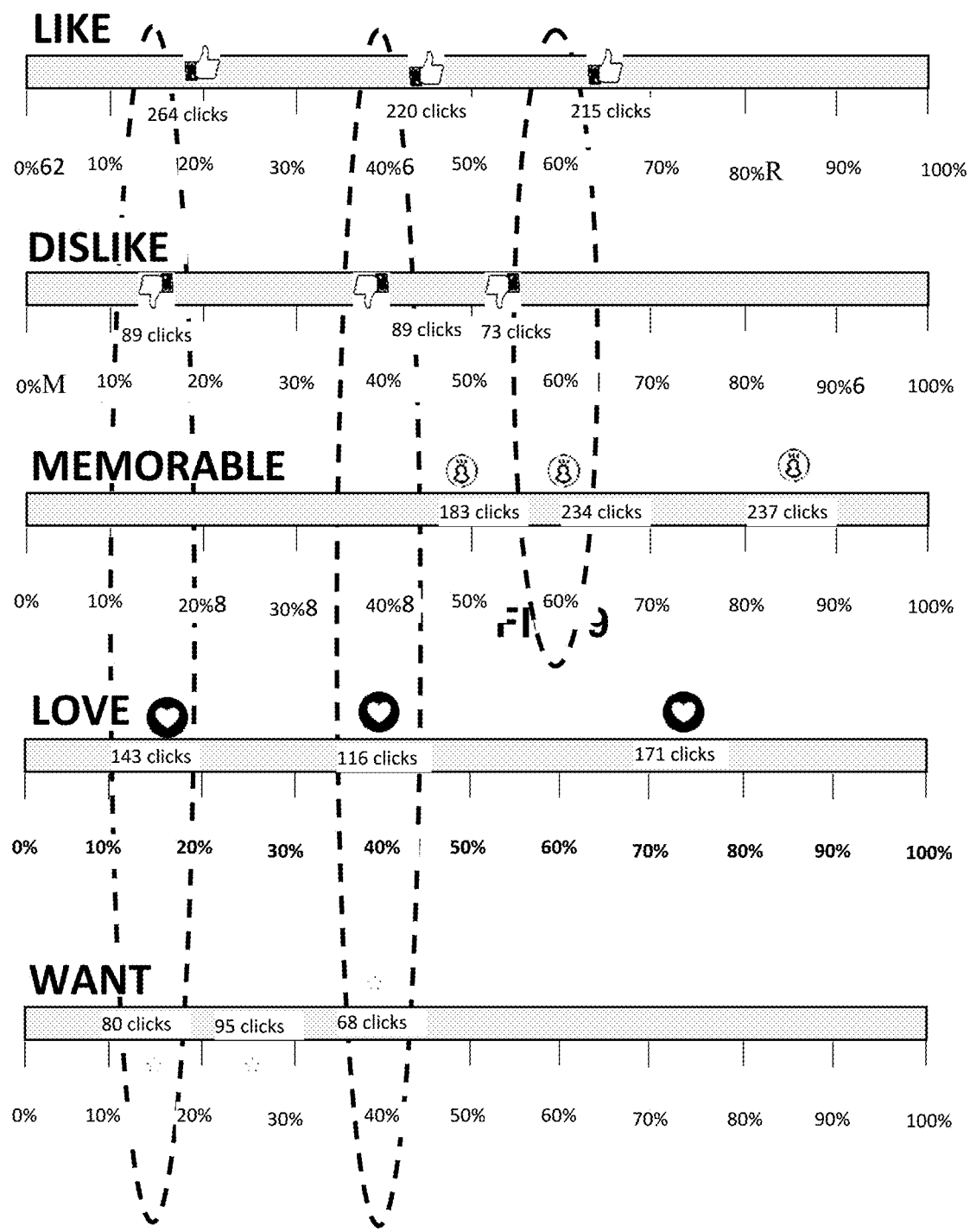
FIG. 10 shows a plot of reactions captured for second set of participants in accordance with an exemplary embodiment of the present invention.

The processor in the server process the determined emotional states, their value and valence for each participants in the first set of participants, to identify three different groups or cohorts of participants in that set. These three different cohorts of participants are determined with three absolute level of valence. These levels are: "high", "mid" and "low". In order to identify the participants that are included in each of the levels or cohorts, the standard deviation of the sample is calculated, and, proportional to the total number of the participants, a percentage of the standard deviation is taken. "High" cohort contains the participants that are above the chosen percentage of the standard deviation, "mid" cohort contains the participants between the upper and lower the chosen percentages of the standard deviation, and "low" cohort contains the participants that are under the chosen percentage of the standard deviation. Averages of the total number of participants are calculated for each second of the video and for each cohort. FIG. 10 shows different level or cohorts of participants. The top cluster 802 signifies the cohort of participant which are in high level. The middle cluster 804 are the cohort of participants at mid-level, whereas the bottom cluster 806 denotes the cohort of participants with low level of valence. The mid-level are the cohort of participants that have average level of valence. The high level 804 are the set of users who have valence one standard deviation above the overall average (these are the more positively emoting set or cohort), and the low-level cohorts are the one that depicts the overall valence of the set of participants who have valence one standard deviation below the overall average (the lowly emoting set or cohort). The peaks and valleys of these three graphs are calculated to infer the most positively reacting regions of the content. In one embodiment of the invention wherever the peaks of the valence graph of the more positively emoting cohort coincide with the peaks of the valence graph of overall people, these frames are identified as candidates for peaks in emotional reaction.

In FIG. 9, the calculated averages over time are plotted for all three cohort of participants into a 2d scatter representation. The points' connecting lines and a customized trend line are plotted as well. From the plotted lines three main indicators can be read: 1) Slope trends: increase, decrease and sustained areas, 2) Magnitude trends: high and low areas, and 3) Peaks: high and low punctual and absolute maximums and minimums. The combination of the tree indicators points to fragments of the video content that may be eager to trigger several physiological responses. This video fragments, are potential candidates to be the top maximum and minimum video scenes or video frames in terms of physiological responses: engagement detection and emotional detection.

Real-Time Reactions Detection and Reaction Analysis (Video Content)

Similar to the first set of participants, when a campaign is launched by a content owner, the second set of participants are informed through notification that the campaign is launched. The notification is similar to the one which is used for the first set of participants. In order to easily provide the feedback while the video content is displayed, the participants are presented with a set of emoji's that represent real-time emotional reactions. In one embodiment of the invention the default emojis are Like, Dislike, Love, Memorable, and Want. The set of emojis are personalized depending of the nature of the content and the content producer's objectives of the campaign. When video content is displayed, the system records each of the participants' clicks on the emojis noting the exact time instance of the content timeline where the clicks were done.

For the second set of participants who were sent the content for capturing frame by frame Emoji reactions, the overall frequency on a per frame basis is calculated for the whole sample. In one embodiment of the invention the frequency of each Emoji is calculated for the whole sample in a time interval of 4 sec. This time interval could be changed.

In an embodiment, when all the Emoji frequencies are calculated, the top three peaks for the entire content are plotted as a function of time length of the digital content.

The peaks of these Emojis are observed for the full length of the content. In one embodiment of the invention the points in the content timeline are identified where multiple positive peaks of different Emojis match. For example, if there is a point where one of the top 3 peaks of Like matches with one of the top 3 peaks of Love &/or Memorable, this point is identified as one of the candidates of relevance for the overall audience.

From the real time reactions recorded while watching the video, each reaction type is clustered in the tree clusters of highest frequency of appearance along the video duration. The number of clicks that sum up for each cluster is calculated, and resulting clusters are plotted in a horizontal time line corresponding to the duration of the video campaign. FIG. 10 shows a plot of reaction captured for second set of participants. The plot shows three clusters which indicate the fragments of the video content that are more eager to trigger the clicked reaction.

Figure 11:
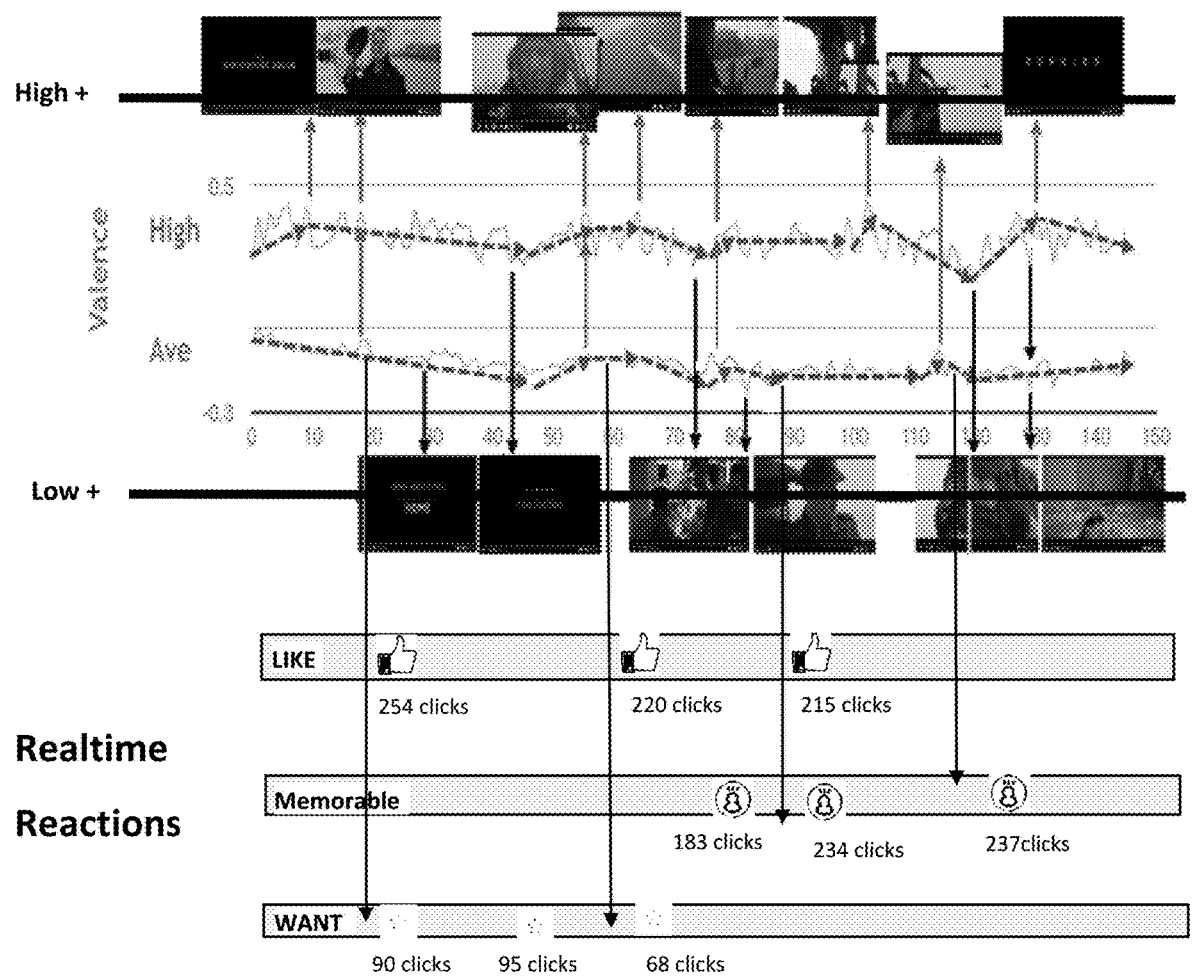
FIG. 11 shows a graphical representation of analysis of the media content by the first set of participants and the second set of participants in accordance with an exemplary embodiment of the present invention.

FIG. 11 shows a graphical representation of analysis of the media content by the first set of participants and the second set of participants. The result of emotion (facial expression) and reaction of the first set of participants and the second set of participants respectively are placed vertically one down another. For the same content, the correlation in the peaks of the Emotion analysis and the reaction analysis is observed. Wherever the time segments or the peaks of these two analysis match, those time segments are identified as segments which are most positive segments or most relevant segments for the entire set of participants. These segments can then be used for creating even more engaging content for the target audience segments for more effective marketing of the same content using very short form digital content.

Figure 12:
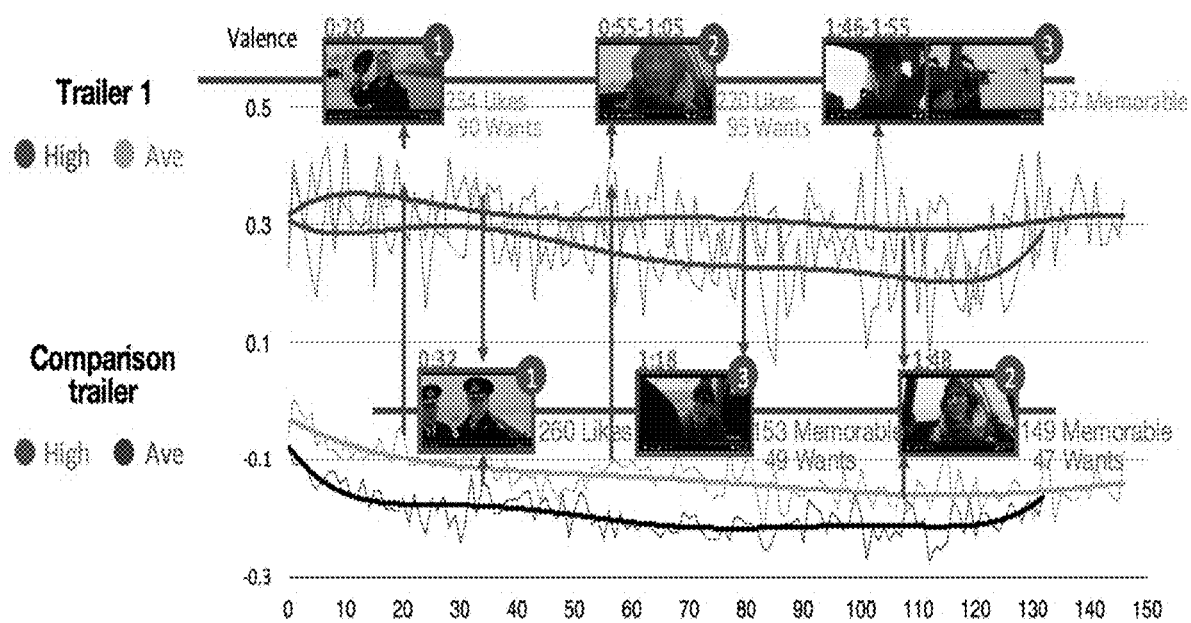
FIG. 12 shows the analysis of two media content with same video frames arranged in a random manner in accordance with an exemplary embodiment of the present invention.

In an embodiment of the present invention the system and method of the present invention can be used to self-validate the analysis of this method. FIG. 12 shows the analysis of two media content with same video frames arranged in a random manner. The two media contents are shown to same set of participants: one set for emotion analysis and second set for reaction analysis. It can be observed in FIG. 12, that with same group of participants, the analysis of both the media content shows three same segments that are of high relevance or interest to the same group of participants.

In an embodiment, the invention could be generalized by doing similar peak analysis of yet another set of people with yet another dimension of Non Verbal Cue capture. For example, the system can ask people to say something as they are watching the digital content. The system would then convert audio into text and do text sentiment analysis at each frame. At the point of the frames where there are peaks in positive sentiments could be identified as points of interest for relevance for the content. This could also then be correlated to the peaks of Emotions and Reactions. In another embodiment the audio captured for each user could be analyzed for audio intonation. The peaks in positive emotion in the intonation analysis for the overall sample average could also be used to correlate with the peaks of Emotions and Reactions for making the final determination. Some other modes of such Non Verbal Cues for doing correlation analysis could be Gestures, Eye Tracking, Head Tracking and possibly feedback from other sensory inputs, if available, that could capture haptic, tactic feedback that could relate to audience engagement or disengagement.

In another embodiment, the segment analysis for emotions and reactions of participants can be segmented based on demographics, age, gender, ethnicity etc. Since the overall system allows targeting people based on narrow demographics, eventually, such relevancy identification could be done based on these narrow demographics as well.

Identification of Demographic Data of Different Emotional Cohorts:

In the emotional analysis we identify 3 different cohorts—most positively reacting cohort, the overall average, and most negative reacting cohort. Once this identification is done, the system can automatically pull the demographic data of most positive and most negative cohort and export this data in a form that could be used for further analysis. An embodiment of this step could be printing out age/gender/ethnicity data of all the people in one cohort. Another embodiment could be generating a bar graph of frequency of occurrence in different major age groups or different gender or ethnicity or any other trait of the user that is available in the system data base. If primary set of information of users is available (for example, e-mails), this information could also be provided. All this information is very useful to the content owner to make subsequent business decisions. One of these decisions could be reaching out to the users for subsequent set of survey questions.

The method and the system of the present invention can be used for finding relevant portion of digital content from within a large piece of digital content. The method can be used to identify most engaging portion of the media content, which can then be used to create short form video or trailer that can help production house in attaining a huge audience. In other instances, the method has its utility in large digital platforms which can used the method to create a heavy dose of entertaining short digital video or audio clips. This helps content creators and brands to recognize which content connects with which audience and helps in micro-targeting people based on their likes, dislikes, emotional reactions, social media comments and any other behavior pattern in relation to a certain context.

In another instances, the method is useful for content creator like movie studios that spend a lot of time and money protecting their new movies and shows. The method can be used to identify the most engaging portion of a video and helps in figuring out how to cut the most important short segments of a trailer that could be used in creating very short segments of the movie in social media before launch. Knowing the segments which have the best emotional and reaction connection with specific audiences helps the movie studio to advertise very effectively, thereby increasing the chances of having a large turnout in movie theatres upon release.

In another embodiment of the present invention, it provides a system and method for capturing and analyzing a user reaction metrics for a digital content distributed over a shared network connection, and more particularly, to an artificial intelligence (AI) powered intelligence platform for generalizing the content analysis for personalization and ranking purposes using non-verbal and behavioral cues.

Figure 13A:
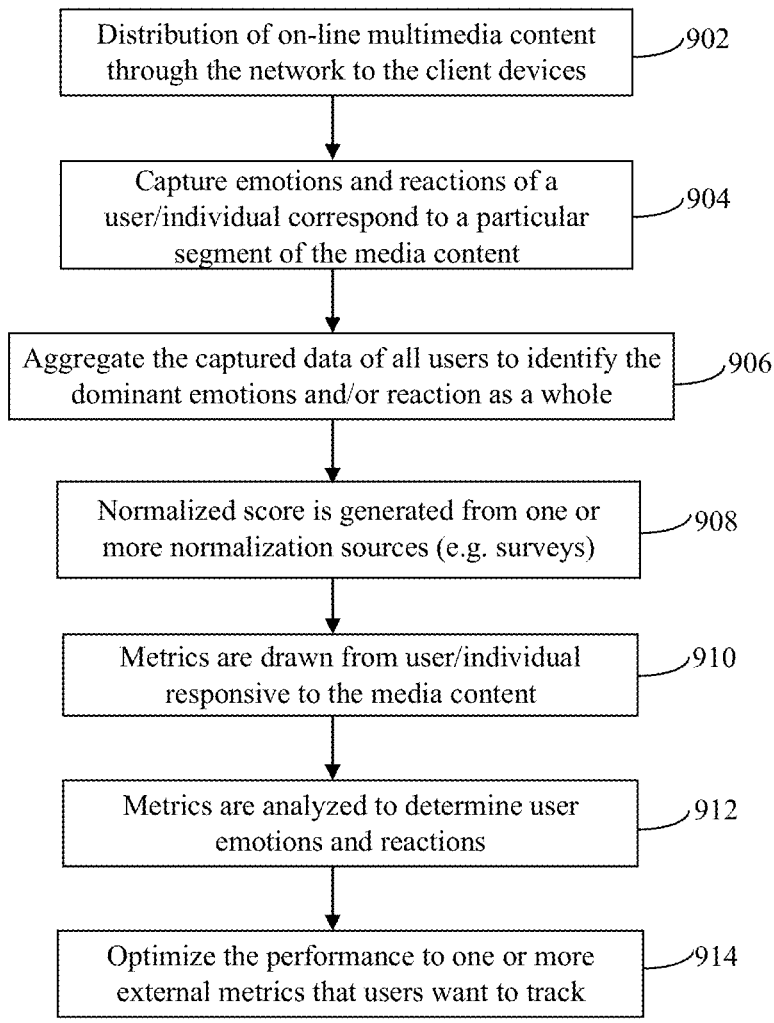
FIG. 13A illustrates an exemplary method to use the system to normalize and ranking online media content based on user reaction in accordance with an embodiment of the present invention.

FIG. 13A illustrates an exemplary method to use the system to normalize and ranking online media content based on user reaction in accordance with an embodiment of the present invention. Referring to FIG. 13A, the method has the following steps: Step 902: The online media content are distributed in the cloud network 106. The client device 1 116, client device 2 112, and client device N 102 are configured with a server in the cloud network 106 that is having a multimedia repository containing content that are accessible by the client devices of the users. In the system server and one or more client devices (102, 112, 116 . . . N) communicatively coupled to one another via a cloud network 106. The media content may be but not limited to movies, music, movie theme, web series, episodes, slides, product advertisements, movie teasers, games and other forms of electronic content. The duration of the media contents may be but not limited to 30 seconds, 60 seconds, 1 minute, 5 minute, 24 minute, and 48 minute.

Step 904: The users, by using the client devices 102, 112 and 116 watch the media content and their response in the form of emotions and reactions to the media contents is tracked down by the emotion tracker module present in the client device. Different users have different response to the watched media contents and thus their input is noted so as to rate/rank the media contents. The client devices 102, 112 and 116 have an emotions and/or reactions tracker module that has an inherent ability to continuously capture some critical sensory and non-sensory cues inputs from the individuals. The emotions and/or reactions tracker module is a functionality that may be a combination of the available sensors in the client device (camera, digital camera, video camera, webcam, microphone, other sensors like tactile/haptic etc.) and the available processing modules present in the client devices. The client device captures various kinds of auditory, visual, location based, text based, sensory and other kinds of sensory and non-sensory cues inputs and generates an instantaneous emotional, attention and reaction scores corresponding to the particular media content. The emotion tracker module in the client device has the ability to track whenever users hovered their mouse cursor over the iframe for a certain amount of time. The sensory cues of the individuals include visual cues, auditory cues, haptic cues and the like. The non-sensory cues of the individual include happy, sad, disgusted, fearful, angry, surprised, neutral and the like.

The method proceeds to step 906: at step 906 of the method it calculates an aggregate reaction index for each portion of watched media content by aggregate reaction generator module present in the client device. According to an embodiment, an aggregate reaction index is computed as the average of all users who have watched the media content(s). The method as shown in FIG. 13A calculates an average interest index for each portion of the video for which data exists in the reaction data. According to other embodiments, the respective interest indices are weighted and aggregated in accordance with user selectable options. This aggregate information can be used to create a probability density function of emotions and/or reaction of the users for each segment of program viewed. The probability density function of the aggregate data quickly identifies which emotions of the users as a whole are considered primary or dominant emotions with respect to any given segment of the program. For instance, the probability density function may reveal that the emotional response of the users at a given period of time during the program is basically limited to one of three specifically identified emotions. In this example, any emotion other than the three dominant emotions may likely be the result of incorrect analysis.

In some embodiments the server includes an aggregate reaction generator to calculate an aggregate reaction index for each portion of watched media content. The Emotional score or Attention score or Reaction score is then shared as a meta-data that contains information such as the user, the time of watching of the content, the content itself, and is tagged to both the user and the content. This Emotional Score, in various forms, may then be shared in the user's profile in the cloud network. Similarly the content's Emotional Score as a result of a single user's input or a large set of user's input may also be shared in the cloud network 106.

The method proceeds to step 908: at step 908 of the method, a normalized score is generated from one or more normalization sources. Normalization sources can include, but is not limited to, consumer surveys, social group data (e.g., online social networks), and the like. The normalization can be done by using K mean, data mining, feature scaling and the like.

Step 910: Based on the normalized score of the emotions and reactions of the user, the client device having a metrics generator engine that generates metrics from the consumer responsive to the interaction with the media contents. It should be appreciated that metrics can be continually collected throughout the interaction with the media contents. Step 912: Metrics can be analyzed to determine the user impression. The generated metrics of the user reaction is communicated in the cloud network 106 and it is stored in the central repository. The central repository may reside in a geographically different place and is connected to the rest of the client devices in the network. Step 914: Optimize the performance to one or more external metrics that users want to track.

In some embodiments of the present invention the client device continuously captures the user's input over a period of time in response to the content or event being watched. Based on the varying inputs of the user over a period of time, the profile of the user keeps on evolving. These sets of varying profiles are stored in the repository and a time averaged profile is generated which could then be used to assess or predict the behavior of the user for different kind of content in the future.

Figure 13B:
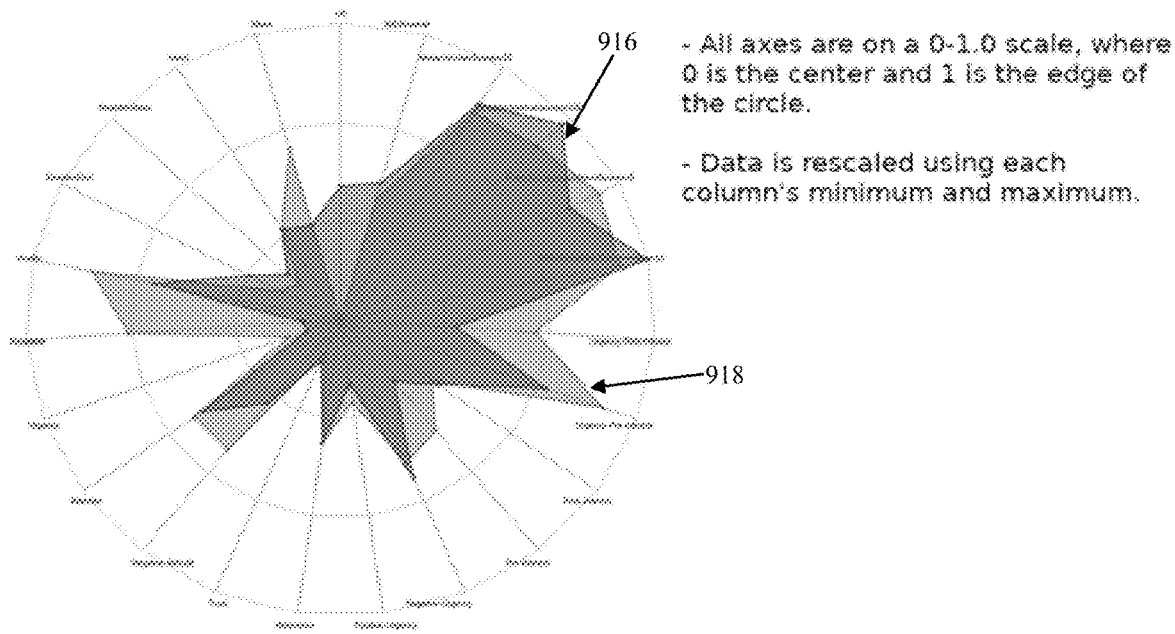
FIG. 13B illustrates a radar chart map of all external metrics captured from both sub-conscious and conscious cues in accordance with an embodiment of the present invention.

FIG. 13B illustrates a radar chart map of all external metrics captured from both sub-conscious and conscious cues in accordance with an embodiment of the present invention. Referring to FIG. 13B it shows a variety of metrics captured from both sub-conscious and conscious cues including self-reported results from Pre/Post Survey that are integrated into the platform. It shows a set of action-based metrics more related to attribution that would become part of this measurement. In FIG. 13B the radar chart illustrates the graph for two different users for instance Black Klanssmann 916 and for Crazy Rich Asians 918

Figure 13C:
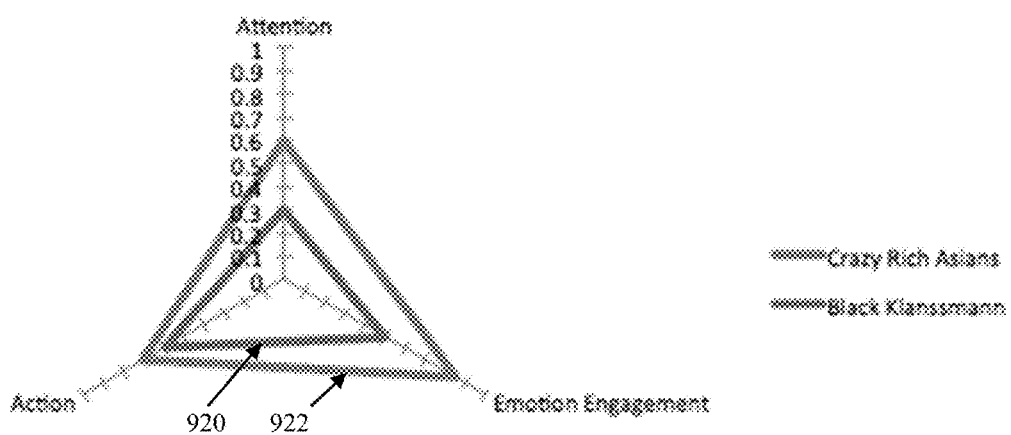
FIG. 13C illustrates the collapse of metrics of FIG. 13B into 3 dimensions to build a consistent analytics framework in accordance with an embodiment of the present invention.

FIG. 13C illustrates the collapse of metrics of FIG. 13B into 3 dimensions to build a consistent analytics framework in accordance with an embodiment of the present invention. The system tracks both sub-conscious and conscious metrics of audience into a specific context or content and builds prediction models based on observed user's behaviors. Traditional marketing science has relied on AIDA model (Awareness, Intent, Desire and Action) to build marketing predictions. The AIDA Model identifies cognitive stages an individual goes through during the buying process for a product or service. It's a purchasing funnel where buyers go to and fro at each stage, to support them in making the final purchase. The present invention provides a platform to measure the user/audience reaction to content and maps it into 3 main dimensions via its holistic capture of audience immersion into the media content. By tracking both sub-conscious and conscious metrics that capture audience thinking as they are exposed to new messages we can get higher confidence correlations between what audiences think and what they do. It provides the clear measure to the service or product or media content provider what users/audiences think about their service or product or media content before launching the final service or media content in case of movie teaser, product advertisement etc.

Referring to FIG. 13C, the performance of the system is evaluated on the basis of the watched multimedia contents.

It shows the performance of the system be reported in three dimensions of Attention, Emotional Engagement and Action—all normalized between 0 and 1. Eventually the emotional score is generated as a weighted combination of all the metrics that were captured by the client devices. An illustrative example of how all the observed metrics could be mapped to the three dimensions is shown in FIG. 13C. For example the multimedia contents are allowed to watch by the Crazy Rich Asians and Black Klanssmann and their corresponding captured metrics are 920 and 922 as shown in FIG. 13C.

Referring to FIG. 13C Attention—it refers the user of the client device giving attention to the content and sub-conscious and conscious metrics capture subtle degrees of attention throughout the user interaction with the content. Factors that contribute towards Attention measure include: (a) Overall attentiveness of each audience through the exposure of the content as captured by Eye/Head movement and percentage of time audience has spent looking into the content, (b) Eye Gaze concentration metrics, (c) Overall Normalized Reaction Annotation frequency, and (d) Intensity of Emotion displayed throughout the content. The present invention is also capable to develop a specific attention metrics for short form video content—(i) Attention metric for 6 second video, (ii) Attention metric for 10 second video.

In an embodiment, the attention metric may comprise audio based and gesture based metric.

Phase 1 calculations of Attention: The measurement for Attention is calculated by using Attention metric based on % frames audience is looking at content, Intensity of Emotion based on Arousal, and Normalized Annotation Frequency (Normalized on per user, per second basis and based on High and Low of all media content).

Phase 2 calculations for Attention: The measurement for Attention is calculated by using Attention metric based on % frames audience is looking at content, Intensity of Emotion based on Arousal, and Normalized Annotation Frequency, and Eye Gaze Concentration metric.

Emotional Engagement—This captures the degree of positive emotional engagement displayed by audience. This captures both sub-conscious (Emotional Valence and Emotions End Slope), as well as conscious (Reaction Ratios), and overall quantitative metrics related to positive/negative annotations. In use cases where audience voice feedback is captured, it also includes the overall positive/negative annotation of audience audio as well.

Phase 1 calculations of Emotional Engagement: Emotional Engagement is calculated by taking into consideration Normalized Emotion Valence, Normalized Emotion End, and Normalized Reactions Ratios.

Phase 2 calculations of Emotional Engagement: Emotional Engagement is calculated by considering Normalized Emotion Valence, Normalized Emotion End, and Normalized Reactions Ratios and normalized Quantitative Score of Positive/Negative Comment Sentiment based on all Reaction Annotations.

Phase 3 calculations of Emotional Engagement: Emotional Engagement is calculated by considering Normalized Emotion Valence, Normalized Emotion End, and Normalized Reactions Ratios and normalized Quantitative Score of Positive/Negative Comment Sentiment based on all Reaction Annotations, Normalized Audio Intonation Analysis for relevant use cases and Normalized Galvanic Skin Response.

Action—The action metric captures the eventual result of the Creative/Advertisement on the user. The present invention offers ways to customize Pre/Post Survey questions in a way to capture Intent (View/Purchase), Brand Affinity, Inclination to Share, and any other metric that could be captured via questions from the user. In addition to these explicit questions it offers a more intrinsic way to measure audience action via its software development kit (SDK) solution where actual attribution of a specific user exposed to the content or brand message is done and correlated with specific user key performance indicators (KPI).

Phase 1 calculation of Action: Action is calculate by considering Normalized value of Intent (View/Purchase), Normalized value of Share, Normalized value of Relatable and Normalized value of Memory/Recall/any custom metric as required by client.

Phase 2 calculation of Action: Action at this level is calculated by considering Normalized value of Intent (View/Purchase), Normalized value of Share, Normalized value of Relatable and Normalized value of Memory/Recall/any custom metric as required by client, Attribution Metric 1 tracked post exposure, and Attribution Metric 2 tracked post exposure.

Figure 13D:
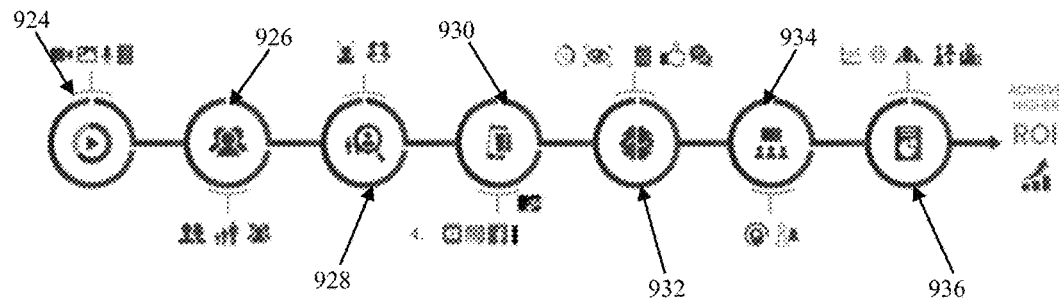
FIG. 13D illustrates a platform on which a method of measuring user's unconscious and conscious emotions are implemented in accordance with an embodiment of the present invention.

FIG. 13D illustrates a platform on which a method of measuring user's unconscious and conscious emotions are implemented in accordance with an embodiment of the present invention. Referring to FIG. 13D, users or audiences pick the media contents 924 from their corresponding client devices 102, 112 and 116 from the cloud network 106. The cloud 106 may be but not limited to a local server, a remote server, a cloud server, a distributed server, etc. The targeted users or audience 926 picks the media contents 924. In the next step prescreening 928 is performed on the targeted users based on their captured emotions and reactions of the watched media contents. The prescreening may be but not limited to movie teaser, product advertisement (still not launched in the market) etc. Emotional data and facial expressions are collected from plurality of user interacting with a media presentation. Processors are used to analyze the image data and media presentation, and to extract emotional content of the viewer. An immersive testing 930 is performed on the captured users emotions and reactions. Both the sub-conscious and conscious metrics measurements 932 are performed in the next stage. Sub-conscious and conscious metrics are determined from the emotional content, and the emotional metrics are retained in storage components. The sub-conscious metrics are always captured from the user in any test and the conscious metrics that could be changed based on user inputs. The emotional metrics are coalesced into a summary emotional metric, and the summary emotional metric is displayed on a screen. The post screening data 934 of the user is collected in the next stage of the invention. The post screening data 934 is related to the reaction of the users or no. of the users/audiences watched the movie or bought the product. The platform as shown in FIG. 13D captures a variety of user reaction metrics for a given business context. Science based algorithms are used to determine the best combination of metrics and their weights, for a particular audience segment, to predict with highest accuracy a given business key performance indicator (KPI) 936. The present invention identifies what kind of promotional messages cause what kind of emotional pivots in what kind of movie goers, the platform provides valuable information in optimizing their marketing dollar ROIs.

Figure 13E:
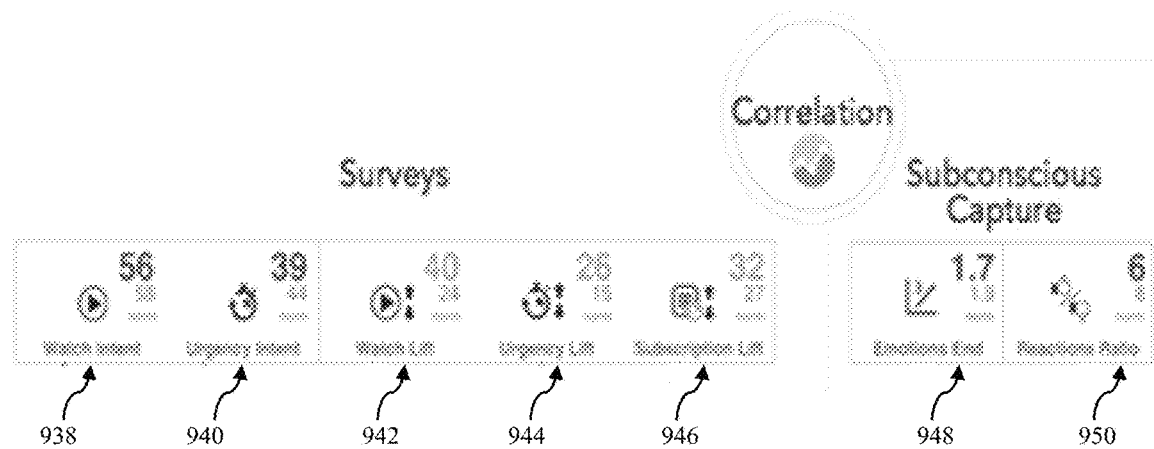
FIG. 13E illustrates an exemplary process of the captured metrics from different audience segments in accordance with an embodiment of the present invention.

FIG. 13E illustrates an exemplary process of the captured metrics from different audience segments in accordance with an embodiment of the present invention. Referring to FIG. 13E, the watch intent 938 represents the data captured from the users/audiences based on the preview of media contents (like upcoming movie teasers, web series and the like)

watched by users/audiences recently. The urgency intent 940 shows the data of users/audiences who have built up their mind to watch the movie as soon as it released in the theatre. The watch lift 942 is calculated by subtracting Pre Survey (definitely interested to watch to watch media content after release) from Post Survey (definitely watched the media content). Similarly, the urgency lift 944 is determined by subtracting Pre Survey (watch the media content as soon as it is released) from Post Survey (watched the media content as soon as it is released). The extremely liked media contents are allowed to subscribe to make the subscription lift 946. In the next step of the invention the sub-conscious capture metrics is generated which comprises emotions end 948 and reactions ratio 950. In emotion end 948 metrics comprises the higher positive number indicates media content ends on a positive emotional note, positive correlated with lift and intent metrics (watch, urgency and subscription). Reactions ratio 950 metrics holds Positive Clicks/Negative Clicks (where positive clicks=clicks on like, memorable icons and negative clicks=clicks on dislike, confusing, boring icons) pressed by the audience after watching the media contents.

Figure 13F:
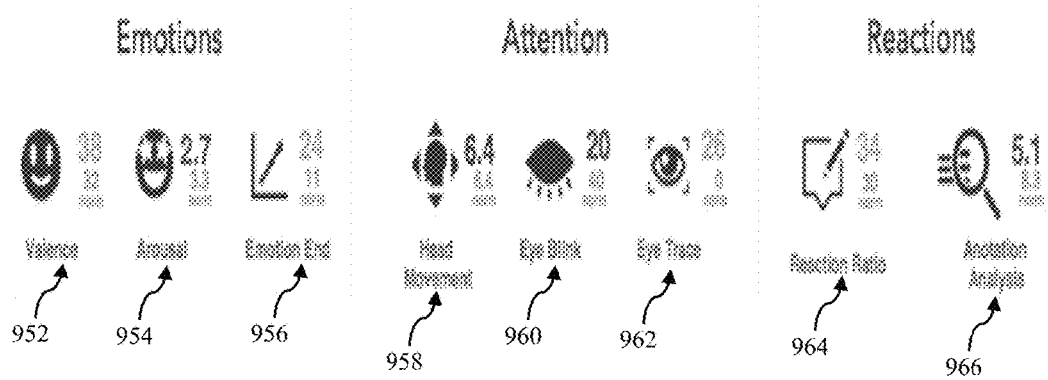
FIG. 13F illustrates an exemplary process of capturing and analyzing the sub-conscious metrics of user's response to media content in accordance with an embodiment of the present invention.

FIG. 13F illustrates an exemplary process of capturing and analyzing the sub-conscious metrics of user's response to media content in accordance with an embodiment of the present invention. Referring to FIG. 13F, it depicts that sub-conscious metrics analysis is performed based on three dimensions i.e. Emotions, Attention and Reactions, all normalized between 0 and 1. Eventually the emotional score is generated as a weighted combination of all the metrics that were captured by the client devices 102, 112 and 116. Emotions include the valence 952, arousal 954 and emotional end 956 metrics as shown in FIG. 13F. The emotion valence 952 is the aggregate of all detected emotions. Arousal 954 is the physiological and psychological state of the user/audience is analyzed in this step. The emotion end 956 metrics comprises the higher positive number indicates media content ends on a positive emotional note, positive correlated with lift and intent metrics (watch, urgency and subscription).

The next sub-conscious metrics i.e. Attention comprises the data related to head movement 958, eye blink 960 and eye trace 962 of the user/audience while watching the media content. Eventually, the Reactions of the audiences are analyzed based on reaction ratio 964 and anotation analysis 966. Reaction ratio 964 analyzes the ratio of positive and negative likes hit by the audience while watching the media contents. Anotation analysis 966 has the average value across all trailer campaigns that have been run on the platform of the present invention.

The metrics captured and analyzed on the platform of the current invention are the combination of sub-conscious and conscious metrics. Sub-conscious metrics are always captured from the audience in any test and conscious metrics that could be changed based on user inputs (like click, dislike click etc.). The present invention also has ability to add attribution or action metrics that are based on real observation of subsequent action of people who have been exposed to a particular content.

In another aspect of the present invention, it generates customer key performance indices and external ranking. It generates plurality of external metrics that customers want to track.

For entertainment the present invention is able to work on a variety of standard external metrics and also adding more metrics that could be customer or customer vertical specific.

For entertainment asset testing the system tracks the following external metrics for movie promotion or movie content testing:

Movie Content: A partial list of External Metrics tracked on per asset basis by the present invention.
IMDB Overall Ranking (IMDB)
YouTube Likes/Dislike Ratio (YT_LD)
Box-office Performance (Released content) (BO)
Meta-critic Internal Ranking (MC_I)
Meta-critic User Ranking (MC_U)
Rotten tomatoes User Ranking (RT_U)
Rotten tomatoes Tomato meter Internal Ranking (RT_I)

For Brand Advertisements vertical, or any other vertical, system will similarly have a list of external metrics to track and optimize its measured metrics with.

The system of the present invention has built a data science driven algorithm to predict external metric performance based on user data collected at scale within its performance. The algorithm uses correlation of multi-modal data collected at a per user basis for all the assets that have gone through the platform of the present invention and is constantly improving in its prediction over time.

For all the assets that have gone through the platform all the metrics (M) are calculated. For all possible combinations of the metrics, one metric is chosen as "pivot" to do principal component analysis and generate an overall normalized score based on the choice of metrics and pivots. Total Possible combinations could be MC2, MC3 . . . MCM. One thing is to be noted that at least two metrics will always be used for ranking computation.

All the assets are then ranked (High (1) to Low (N=number of assets) based on the overall score achieved based on the weighted score calculated.

The weighted score for each asset is calculated by multiplying the normalized value of the metric $Norm[(m(i))]$ with the correlation value $C\_m(i)\_m(j)$ and summing it across all metrics being considered. Once the weighted score is calculated for all assets for the combination of metrics and pivot chosen, then a ranking is generated for all assets by the ranking module may be present in the client devices or in the cloud. Based on the External Metrics being tracked, an overall Similarity Score of Rankings is calculated for the rankings achieved by the weighted score for the combination of metrics and pivot chosen and the rankings for all the assets with the External Metric. The combination of the metrics and pivot that achieves the highest similarity measure is chosen to be the one that is used for all the rankings of asset for all campaigns. For details of one implementation of this algorithm.

In a following example, 3 key metric are being tracked: (m1=Lift, m2=Emotions End, m3=Reactions Ratio). Assuming the External Metric of importance is YouTube Like/Dislike Ration=YT_LD. Assuming there are 100 assets for which metrics are collected i.e. Asset 1 (A1), Asset 2 (A2) . . . Asset 100 (A100).

A Correlation Map of metrics would look like the following 3×3 matrix. An Example of Correlation matrix for a given campaign looks like following:

|  | Lift (L) | Emotions End (EE) | Reactions Ratio (RR) |
|---|---|---|---|
| Lift (L) | 1.0 | C_(L_EE) | C_(L_RR) |
| Emotions End (EE) | C_(L_EE) | 1.0 | C_(RR_EE) |
| Reactions Ratio (RR) | C_(L_RR) | C_(RR_EE) | 1.0 |

Here C_(L_EE), C_(L_RR) are correlation of Lift with Emotions End and Reactions Ratio and is a number between 0 and 1.0, and similarly for the others as well.

The ranking algorithm picks all possible combinations of metrics and pivots and calculates the ranking of all the assets based on all of these possible combinations.

The possible combinations in this example are (Note that we assume that at least two metrics will always be used for the Ranking calculation).

C1—(Lift, Emotions End, Pivot=Lift)
C2—(Lift, Emotions End, Pivot=Emotions End)
C3—(Lift, Reactions Ratio, Pivot=Lift)
C4—(Lift, Reactions Ratio, Pivot=Reactions Ratio)
C5—(Emotions End, Reactions Ratio, Pivot=Emotions End)
C6—(Emotions End, Reactions Ratio, Pivot=Reactions Ratio)
C7—(Lift, Emotions End, Reactions Ratio, Pivot=Lift)
C8—(Lift, Emotions End, Reactions Ratio, Pivot=Emotions End)
C9—(Lift, Emotions End, Reactions Ratio, Pivot=Reactions Ratio)

For each of these combinations, the weighted score for all assets (A1, A2 . . . A100) are calculated. A ranking is allocated from 1 (Highest Score) to 100 (Lowest Score). A similarity score is calculated with respect to the external ranking (YT_LD) for the 100 assets. The combinations of metrics which yields the Highest Similarity measure with the external ranking is chosen to be the one used to predict all rankings.

As an illustrative example, for calculating the ranking for the case C7=(Lift, Reactions Ratios, Emotions End, Pivot=Lift) and there are following values for the actual values of the metrics captured for the assets: Asset 1 (A1)=(Lift=10, Reactions Ratio=3, Emotions End=0.6, Pivot=Lift).

Normalization Step: For this Asset the first step involves normalization of Lift, Reactions Ratio and Emotions End w.r.t. all values of Lift, Reactions Ratio and Emotions End respectively so that each of these values lie between [0, 1.0]. One way to Normalize data could be to use overall global values for the category as opposed to taking highs and lows within the given cohort.

The Normalized vector could now look like: Norm [Asset (A1)=(Norm(Lift)=0.8, Norm(Reactions Ratio)=0.7, Norm (Emotions End)=0.9), Pivot=Lift. After normalization, the asset ranking scores are calculated and ranking vectors are prepared followed by calculating distance metric and similarity score.

Real-Time Identification of Salient Scene of Media Content

In another embodiment of the present invention, it provides a unique method and system for detection of salient scene based on pushing target content to a defined set of participants (single set of users or viewers) capturing participant's real time reactions in form of non-verbal cues and participant's emotions as the participant watch the media content. The salient scene is referred to as a time periods in the video of particular positive or negative importance. The method and the system is related to identifying the most engaging short segments within a large digital content based on real time emotion and reaction data gathered at scale. The media contents distributed to the user(s) may be but not limited to movies, music, movie theme, web series, episodes, slides, product advertisements, movie teasers, games and other forms of electronic content. The duration of the media contents is dependent on the type of media content, such as advertisement, short film, documentary, campaign, trailers, movies etc. The components of system are described in FIG. 1, in which the system comprises a server module from which a given digital content that is being tested is streamed to a large set of participants or users. A content owner can upload media content in the server for which the content analysis is required. When analyzing the emotions and reactions of viewers who watched a video, the present invention uses a system and method to determine the time periods (which are referred to as "salient scenes") in the video of particular positive or negative importance.

The system is accessible by the content owner and the participants who wish to take part in the content analysis using a web-page or a web-based application. The web-page or the web-based application is provided with features such as secure log-in, personalized profile etc. along with other features.

Figure 14A:
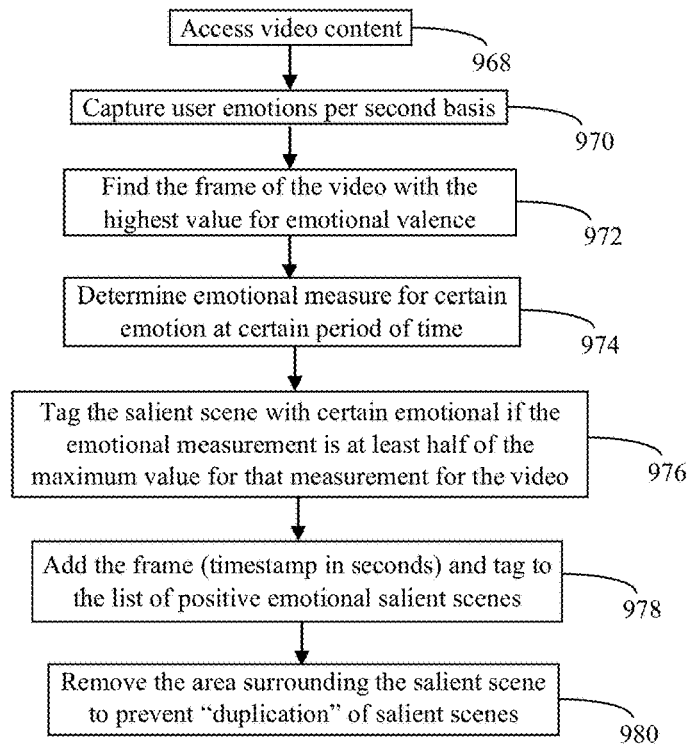
FIG. 14A shows a block diagram illustrating the method used by an application module for tagging the positive emotional salient scenes, in accordance with an exemplary embodiment of the present invention.

FIG. 14A shows a block diagram illustrating the method used by an application module for tagging the positive emotional salient scenes, in accordance with an exemplary embodiment of the present invention. The application module generates a positive emotional salient scene for the media content or demo video by following the method comprising: At step 968, the application module accesses the media (video) content. The system 500 (as shown in FIG. 5) comprises an application module and a processing means. The application module 510 accesses the one or more media content or event 508, the media contents accessed by the application module may be but not limited to movies, music, movie theme, web series, episodes, slides, product advertisements, movie teasers, games and other forms of electronic content. Proceeding at step 970, the system captures the emotional engagement of defined set of participants/viewers per second basis while watching the media content or event throughout the length of the media content. The emotional engagement of the viewer is defined as how the viewer is connected to the video or media content while watching it. The client devices 102, 112 and 116 have a module that has an inherent ability to continuously capture individual cues or emotions while watching the media content. Step 972: the frame of the video with the highest value for emotional valence is found based on emotions of a defined set of viewers captured by the module present in the client device. The highest value of emotional valence shows the positive emotions like Joy, Surprise, Happy, etc. and the minimum or lowest value of emotion valence shows the negative emotions like Fear, Anger, Sadness, Disgust, etc. The captured emotional values are normalized and the emotional valence per second is calculated by "Valence=Max (Happy, Scared)−Max (Sad, Angry, Disgusted)". Step 974: it determines the emotional measure for a certain emotion at a certain period of time during the full length of the media content. Positive emotional valence per second of the user/viewer shows the higher values of Joy or Surprise or Happy at certain time period for entire length of media content. The behavioral classification engine assigns a numerical score to each of the intermediate states that designate the intensity of a corresponding emotion. Step 976: tagging the salient scene with certain emotional if the emotional measurement is at least half of the maximum value for that measurement for the video/media content. The positive emotional salient scene is referred to as a time periods in the video of particular positive importance for example, individual feels happy, joyful while watching the media content. In step 978: the frame (timestamp in seconds) is added and tagged to the list of positive emotional salient scenes. Step 980: after tagging the positive emotional salient scene, the area surrounding the salient scene is removed to prevent duplication of salient scenes.

Similarly, the system find out the negative emotional salient scene of the video or media content based on the negative emotions of the viewer while watching the video. The negative emotional salient scene is referred to as a time periods in the video of particular negative importance for example, individual feels Fear, Anger, Sadness, Disgust, etc. while watching the media content. To determine the negative emotional salient scenes same method/steps are followed as discussed above for determining the positive emotional salient scenes. The minimum or lowest value of emotion valence shows the negative emotions like Fear, Anger, Sadness, Disgust, etc. Both the negative and positive emotional salient scenes are tagged simultaneously.

In an embodiment of the present invention, it calculates the overall emotional score of the viewers for watched media content/video. The overall score is calculated by taking Geometric mean of Attention, Emotional Engagement, and Action.

Attention—it refers the viewer's attention to the media content and sub-conscious and conscious metrics capture subtle degrees of attention throughout the user interaction with the media content. Factors that contribute towards Attention measure include: (a) Overall attentiveness of each viewer through the exposure of the content as captured by Eye/Head movement and percentage of time audience has spent looking into the content, (b) Eye Gaze concentration metrics, (c) Overall Normalized Reaction Annotation frequency, and (d) Intensity of Emotion displayed throughout the content. The present invention is also capable to capture a specific attention for short form video content—(i) Attention metric for 6 second video, (ii) Attention metric for 10 second video.

In an embodiment of present invention, the attention metric may also comprise audio based and gesture based metric.

Emotional Engagement—It captures the degree of positive/negative emotional engagement displayed by viewers. This captures both sub-conscious (Emotional Valence and Emotions End Slope), as well as conscious (Reaction Ratios), and overall quantitative metrics related to positive/negative annotations. In use cases where audience voice feedback is captured, it also includes the overall positive/negative annotation of audience audio as well.

In an embodiment, the emotional engagement metrics may also comprise audio intonation, galvic sensors such as skin conductivity and heart rate.

Action—The action captures the eventual result of the Creative/Advertisement on the viewer. The present invention offers ways to customize Pre/Post Survey questionnaires in a way to capture Intent (View/Purchase), Brand Affinity, Inclination to Share, and any other metric that could be captured via questionnaires from the user. In addition to these explicit questions it offers a more intrinsic way to measure audience action via its software development kit (SDK) solution where actual attribution of a specific user exposed to the content or brand message is done and correlated with specific user key performance indicators (KPI).

Figure 14B:
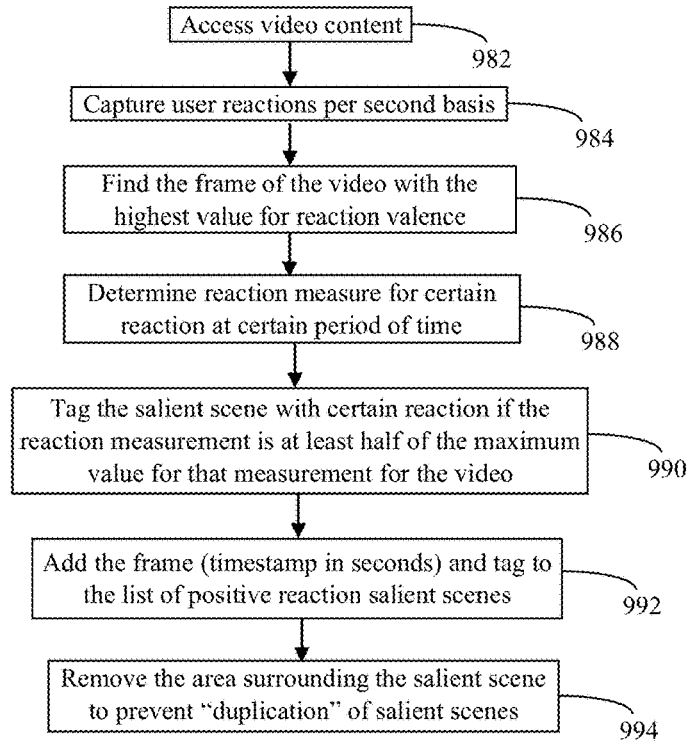
FIG. 14B shows a block diagram illustrating the method used by an application module for tagging the positive reaction salient scenes, in accordance with an exemplary embodiment of the present invention.

FIG. 14B shows a block diagram illustrating the method used by an application module for tagging the positive reaction salient scenes, in accordance with an exemplary embodiment of the present invention. At step 982, the application module accesses the media (video) content. The system 500 (as shown in FIG. 5) comprises an application module and a processing means. The application module 510 accesses the one or more media content or event 508, the media contents accessed by the application module may be but not limited to movies, music, movie theme, web series, episodes, slides, product advertisements, movie teasers, games and other forms of electronic content. At step 984, the system captures the reaction or stimuli of defined set of participants/viewers per second basis while watching the media content or event throughout the length of the media content. In order to easily capture the reaction of the defined set of viewer while the video content is displayed, the viewers/participants are presented with a set of emoji's that represent real-time reactions. The viewers may click on emojis like love, want, memorable, engaging, accurate etc. to show their positive reaction salient scene for particular instant of video or may click on emojis like boring, dislike, confusing, misleading etc. to show their negative reaction salient scene. Proceeding at step 986: the frame of the video with the highest value for reaction valence is found based on reactions of a defined set of viewers captured by the module present in the client device. The highest value of reaction valence shows the positive reactions like love, want, memorable, engaging, accurate etc. and the minimum or lowest value of reaction valence shows the negative reactions like boring, dislike, confusing, misleading etc. The reaction valence per second is calculated by formula "Reaction Valence=(like+memorable+want)−(dislike+boring)".

Step 988: it determines the reaction measure for a certain reaction at a certain period of time during the full length of the media content. Positive reaction valence per second of the user/viewer shows the higher values of love, want, memorable, engaging, accurate etc. at certain time period for entire length of media content. The behavioral classification engine classifies the emotion and reaction separately and assigns a numerical score to each of the intermediate states that designate the intensity of a corresponding emotion/reaction. Step 990: tagging the salient scene with certain reaction if the reaction measurement is at least half of the maximum value for that measurement for the video/media content. The positive reaction salient scene is referred to as a time periods in the video of particular positive importance for example, individual feels love, want, memorable, engaging, accurate etc. while watching the media content. In step 992: the frame (timestamp in seconds) is added and tagged to the list of positive reaction salient scenes. Step 994: after tagging the positive reaction salient scene, the area surrounding the salient scene is removed to prevent duplication of salient scenes.

Similarly, the system find out the negative reaction salient scene of the video or media content based on the negative reactions of the viewer while watching the video. The negative reaction salient scene is referred to as a time periods in the video of particular negative importance for example, individual feels Fear, Anger, Sadness, Disgust, etc. while watching the media content. To determine the negative emotional salient scenes same method/steps are followed as discussed above for determining the positive emotional salient scenes. The minimum or lowest value of reaction valence shows the negative emotions like boring, dislike, confusing, misleading etc. Both the negative and positive reaction salient scenes are tagged simultaneously.

Figure 15A:
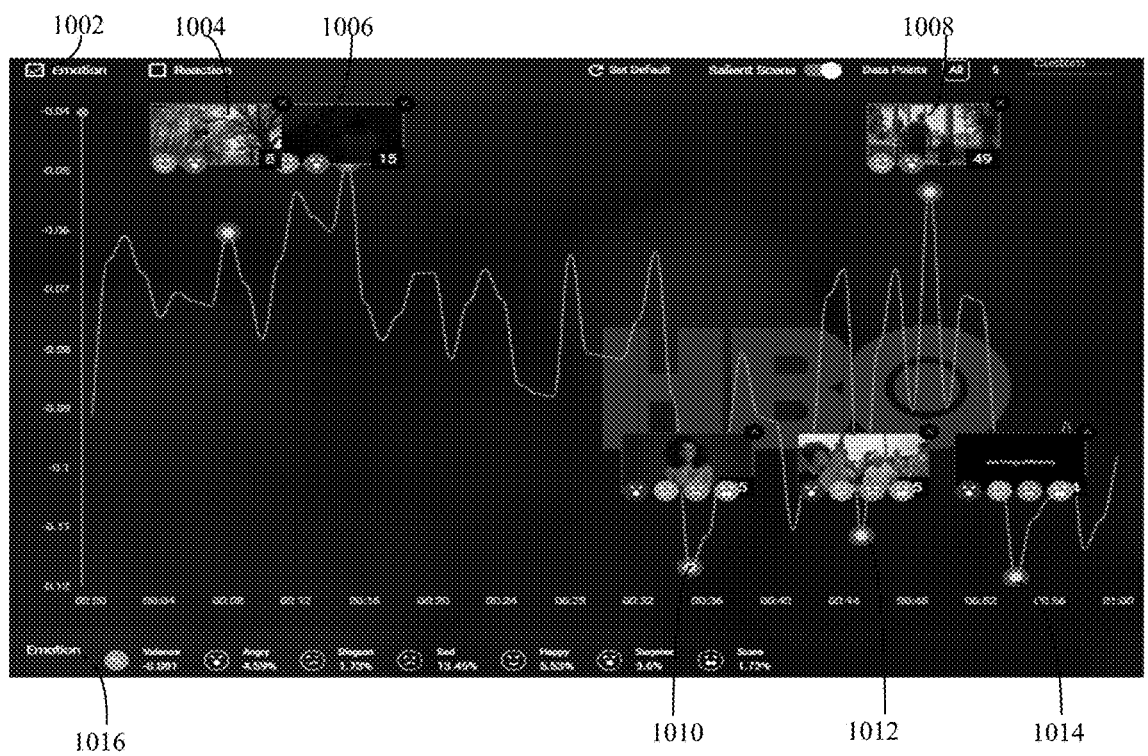
FIG. 15A shows a dashboard on the web-page of service provider for creating campaign by a content owner to create a campaign for capturing positive and negative emotional salient scene of a defined group of viewers/participants in accordance with an embodiment of the present invention.

FIG. 15A shows a dashboard on the web-page of service provider for creating campaign by a content owner to create a campaign for capturing positive and negative emotional salient scene of a defined group of viewers/participants in accordance with an embodiment of the present invention. Referring to FIG. 15A, the dashboard facilitates the media content owners to select or deselect the boxes of Emotion and/or Reaction as per their desire for analyzing the salient scene graph for Emotion or Reaction or both. For example, in FIG. 15A, emotion 1002 box is selected to analyze the positive and negative salient scene for the Emotions of the media content of a defined group of viewers. The peak point values 1004, 1006 and 1008 shows the positive emotional salient scenes and their associated instant video clips. The peak points 1004, 1006 and 1008 shows the maximum emotional engagement of the viewer (at that time instant) while watching the media contents. The highest value of emotional valence shows the positive emotions of the viewers while watching the media contents, the positive emotions are Joy, Surprise, Happy, etc. The bottom points 1010, 1012 and 1014 shows the negative emotional salient scenes and their associated instant video clips of the media contents based on the captured viewers emotions per second basis. The lowest value of emotional valence shows the negative emotions of the viewers while watching the media contents, the negative emotions are Fear, Anger, Sadness, Disgust, etc. At the bottom of the graph/dashboard, the calculated values for the overall emotional score 1016 are shown, like valence=−0.081, Angry=4.59%, Disgust=1.73%, Sad=13.45%, Happy=5.53%, Surprise=3.6% and Scare=1.73%.

Figure 15B:
FIG. 15B shows a dashboard on the web-page of service provider for creating campaign by a content owner to create a campaign for capturing positive and negative reaction saliant scene of a defined group of viewers/participants in accordance with an embodiment of the present invention.

FIG. 15B shows a dashboard on the web-page of service provider for creating campaign by a content owner to create a campaign for capturing positive and negative reaction salient scene of a defined group of viewers/participants in accordance with an embodiment of the present invention. Referring to FIG. 15B, the dashboard facilitates the media content owners to select or deselect the boxes of Emotion 1002 and/or Reaction as per their desire for analyzing the salient scene graph for Emotion or Reaction or both. For example, in FIG. 15B, reaction 1032 box is selected to analyze the positive and negative salient scene for the Reactions of the media content of a defined group of viewers. The peak point values 1018, 1020 and 1022 shows the positive reaction salient scenes and their associated instant video clips. The peak points 1018, 1020 and 1022 shows the maximum reaction valence of the viewer (at that time instant) while watching the media contents. The highest value of reaction valence shows the positive reactions of the viewers while watching the media contents, the viewers may click on emojis like love, want, memorable, engaging, accurate etc. to show their positive reaction salient scene for particular instant of video. The bottom points 1024, 1026 and 1028 shows the negative reaction salient scenes and their associated instant video clips of the media contents based on the captured viewers reactions per second basis. The lowest value of reaction valence shows the negative reactions of the viewers while watching the media contents, the viewer may click on emojis like boring, dislike, confusing, misleading etc. to show their negative reaction salient scene. At the bottom of the graph/dashboard, the calculated values for the overall reaction score 1030 are shown, like valence=1.796, Like=56.72%, Memorable=20.77%, Boring=2.73%, Dislike=9.73% and Misleading=10.06%.

Figure 15C:
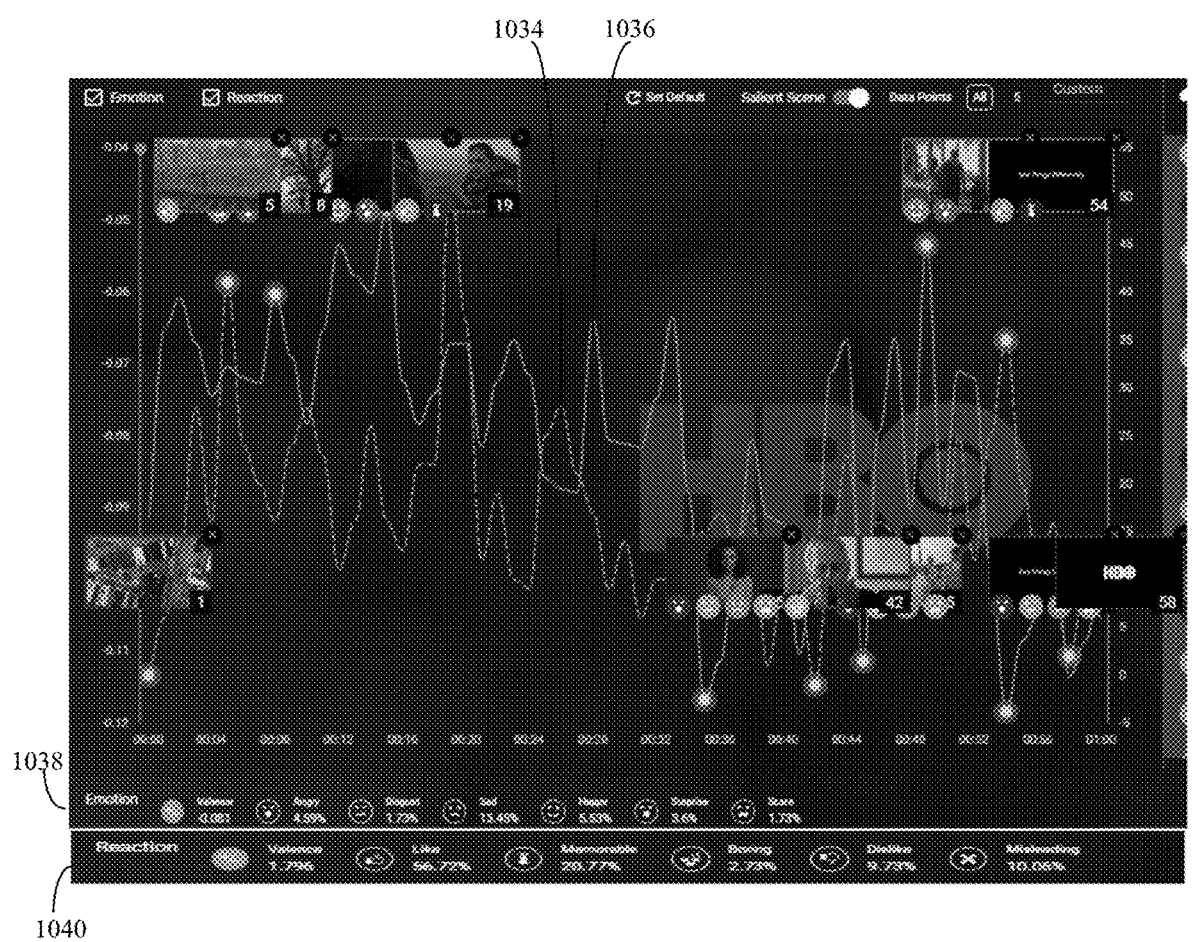
FIG. 15C shows a dashboard on the web-page of service provider for creating campaign by a content owner to create a campaign for capturing positive and negative salient scenes for both emotions and reactions of a defined group of viewers/participants in accordance with an embodiment of the present invention.

FIG. 15C shows a dashboard on the web-page of service provider for creating campaign by a content owner to create a campaign for capturing positive and negative salient scenes for both emotions and reactions of a defined group of viewers/participants in accordance with an embodiment of the present invention. Referring to FIG. 15C, the dashboard of the present invention facilitates to display positive and negative salient scenes for both emotions and reactions of the viewers/participants as shown by the graph 1036 and 1034 respectively. The score for both the emotions 1038 and reactions 1040 graphs is displayed at the bottom of the dashboard.

The method and the system of the present invention can be used to compare the positive/negative salient scene of male and female by customizing the option given in the dashboard. The embodiment of the present invention can be used to capture the emotions and reactions of viewers belong to different age group may be but not limited to 18 to 55 years. The method can be used to identify most engaging portion of the media content, which can then be used to create short form video or trailer that can help production house in attaining a huge audience. In other instances, the method has its utility in large digital platforms which can used the method to create a heavy dose of entertaining short digital video or audio clips. This helps content creators and brands to recognize which content connects with which audience and helps in micro-targeting people based on their likes, dislikes, emotional reactions, social media comments and any other behavior pattern in relation to a certain context.

Another embodiment could be generating a bar graph of emotions and reactions of the viewers based on their likes, dislikes, emotional reactions, social media comments and any other behavior pattern in relation to a certain context.

Another embodiment could be generating a ratio graph of emotions and reactions of the viewers based on their likes, dislikes, emotional reactions, social media comments and any other behavior pattern in relation to a certain context.

Figure 16:
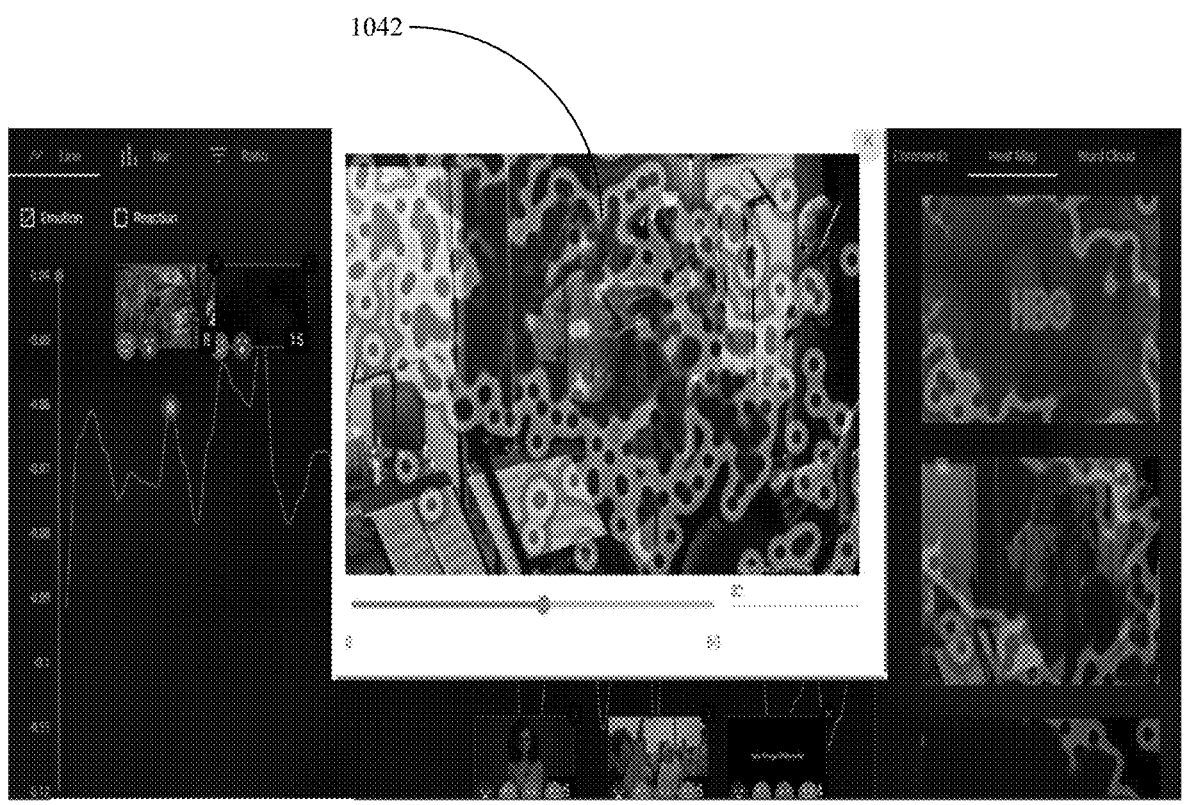
FIG. 16 shows an exemplary illustration of determining the object of interest may include a heat map 1042 that measures a user's gaze at different locations in media content in accordance with an embodiment of the present invention.

FIG. 16 shows an exemplary illustration of determining the object of interest may include a heat map 1042 that measures a user's gaze at different locations in media content in accordance with an embodiment of the present invention. The method and the system of the present invention determines the locations of users gaze in the media content, and generating a heat map 1042 that includes different colors based on a number of user's gazes for each location while watching the contents.

In the embodiment of the present invention, the application module 510 may identify objects within the media content that the user is interest in, based on the user's gaze. In some embodiments, the application module 510 may use a heat map to determine the user's interest in objects of interest as described herein. For example, the application module 510 may use at heat map that measures a user's gaze at different locations in the media content and illustrates the user's gaze with different colors based on a length of time the user spent looking at the different locations. The application module 510 may generate a heat map 1042 where different colors correspond to a number of users that looked at a particular location in the image.

The application module 510 determines locations of user gaze of the media content and generates a heat map 1042 that includes different colors based on a number of user gazes for each location. For example, the heat map 1042 uses red to illustrate the most commonly viewed area, yellow for less commonly viewed, and blue for least commonly viewed.

In one embodiment, the system uses the heat maps 1042 to determine where one or more users are looking. For example, analysis of one or more heat maps may indicate that users frequently look in particular direction when watching a given piece of media content. Subsequent users may benefit from this information since it may help them to know where they should be looking when watching the video or media content. The system may present recommendations to users about where they should be looking when viewing media content. The recommendations may be audio cues, visual cues or a combination of audio and visual cues.

The heat maps or gaze maps may describe a biological function of a user as they are viewing content. For example, the heat maps or gaze maps may include data indicating whether a user was smiling, darting their eyes, experiencing pupil dilation, experiencing an increased heart rate, perspiring, etc. The biological function data may be acquired using sensors such as a camera, heart rate meter, perspiration monitor, etc. These sensors may be included in a device or any combination of devices.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can", "may", "might", "e.g.", and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising", "including", "having", and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z" and "one or more of X, Y, Z" unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not; imply that certain embodiments require at least one of X, at least one of Y, or at least one of Z to be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, virtual or augmented reality device, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

We claim:

1. A system for evaluating media content comprising:
a web-based application to stream a media content to a set of participants;
a server having a processor, and a facial detection engine, the server is configured to:
receive facial expression and emotional engagement of one or more participants of the set of participants in the form of video recordings and processing by the facial detection engine to identify one or more emotions of the set of participants in frame-by-frame manner;
receive reactions of one or more participants in the set of participants, in which the reactions are captured by presenting one or more emojis to the second set of participants while the media content is playing, and asking the second set of participants to click emojis at different time of displayed media content to mark corresponding reactions;
calculate the emotional valence, the difference of positive emotional values and the negative emotional values at a given time frame, from the facial expression of the set of participants;
calculate the reaction valence, the difference of positive reactions and the negative reactions at a given time frame, from the reactions of the set of participants;
wherein the server plots a graphical representation of the emotional valence and the reaction valence of the set of participants; wherein the server is configured to identify the one or more time frames in video that has positive peak values and negative peak values in the graphical representation of the emotional valence and the reaction valence.

2. The system of claim 1, wherein the positive peak values in the emotional expression graphical representation and the reaction of user represent positive salient scenes.

3. The system of claim 1, wherein the negative peak values in the emotional expression graphical representation and the reaction of user represent negative salient scenes.

4. The system of claim 2, wherein the one or more positive salient scenes represent the most engaging time frame of the media content.

5. The system of claim 3, wherein the negative salient scene represent the least engaging time frame of the media content.

6. The system of claim 1, wherein the server is configured to generate an overall emotional score of the media content using emotional expression of the set of participants that watched the media content and rank one or more media content based on the relevance of emotional score.

7. The system of claim 1, wherein the facial expression data and the reaction data can be captured from the same set of participant or from the different set of participants.

8. The system of claim 1, wherein the emotional expression capture of the set of participants include capturing of a user's gaze at different locations in a given frame of the video content.

9. The system of claim 8, wherein the server generates a heat map displaying the user's gaze focus of the set of participants at different location of a scene of the media content.

10. The system of claim 1, wherein the owner of the media content specify the attributes for the set of participants, which includes, but are not limited to age, demography, ethnicity, gender, region.

11. The system of claim 1, wherein the one or more emotions identified by the facial detection includes but are not limited to Angry, sad, neutral, fear, surprise, joy and disgust.

12. The system of claim 1, wherein the reactions of the set of participants include like, dislike, love, memorable and want.

13. A method for evaluating media content comprising:
streaming a media content to a first set of participants and a second set of participants; providing a server having a processor, and a facial detection engine, the server is configured to:
receive reactions of one or more participants in the set of participants, in which the reactions are captured by presenting one or more emojis to the second set of participants while the media content is playing, and asking the second set of participants to click emojis at different time of displayed media content to mark corresponding reactions;
calculate the emotional valence, the difference of positive emotional values and the negative emotional values at a given time frame, from the facial expression of the set of participants;
calculate the reaction valence, the difference of positive reactions and the negative reactions at a given time frame, from the reactions of the set of participants;
wherein the server plots a graphical representation of the emotional valence and the reaction valence of the set of participants; wherein the server is configured to identify the one or more time frames in video that has positive peak values and negative peak values in the graphical representation of the emotional valence and the reaction valence.

14. The method of claim 13, wherein the server is configured to generate an overall emotional score of the media content using emotional expression of the set of participants that watched the media content and rank one or more media content based on the relevance of emotional score.

15. The method of claim 13, wherein the facial expression data and the reaction data can be captured from the same set of participant or from the different set of participants.

16. The method of claim 13, wherein the owner of the media content specify the attributes for the first set of participants and the second set of participants, which includes, but are not limited to age, demography, ethnicity, gender, region.

17. The method of claim 13, wherein the one or more emotions identified by the facial detection includes but are not limited to Angry, sad, neutral, fear, surprise, joy and disgust.

18. The method of claim 13, wherein the reactions of the second set of participants include like, dislike, love, memorable and want.

19. The method of claim 13, wherein the positive peak values in the emotional expression graphical representation and the reaction of user represent positive salient scenes.

20. The method of claim 13, wherein the negative peak values in the emotional expression graphical representation and the reaction of user represent negative salient scenes.

21. The method of claim 13, wherein the one or more positive salient scenes represent the most engaging time frame of the media content.

22. The method of claim 13, wherein the negative salient scene represent the least engaging time frame of the media content.

23. The method of claim 13, wherein the emotional expression capture of the set of participants include capturing of a user's gaze at different locations in a given frame of the video content.

24. The method of claim 13, wherein the server generates a heat map displaying the user's gaze focus of the set of participants at different location of a scene of the media content.

* * * * *